United States Patent
Yokoyama

(10) Patent No.: US 8,045,644 B2
(45) Date of Patent: Oct. 25, 2011

(54) MOBILE TERMINAL, RADIO COMMUNICATION APPARATUS AND RADIO COMMUNICATION METHOD

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 720 days.

(21) Appl. No.: 11/898,165

(22) Filed: Sep. 10, 2007

(65) Prior Publication Data

US 2008/0063116 A1    Mar. 13, 2008

Related U.S. Application Data

(63) Continuation of application No. PCT/JP2005/006053, filed on Mar. 30, 2005.

(51) Int. Cl.
*H04L 27/04* (2006.01)
(52) U.S. Cl. ........ 375/299; 375/267; 375/146; 375/261; 375/298; 370/338; 370/252; 370/328; 370/390
(58) Field of Classification Search .................. 375/267, 375/299, 146, 261, 298; 370/338, 252, 328, 370/390
See application file for complete search history.

(56) References Cited

U.S. PATENT DOCUMENTS

| | | | |
|---|---|---|---|
| 5,859,875 A | 1/1999 | Kato et al. | |
| 6,671,499 B1 | 12/2003 | Ylitalo et al. | |
| 6,931,238 B1 | 8/2005 | Aizawa et al. | |
| 7,366,253 B2 * | 4/2008 | Kim et al. | 375/299 |
| 2002/0145991 A1 | 10/2002 | Miya et al. | |
| 2004/0063466 A1 | 4/2004 | Fujii et al. | |
| 2004/0162021 A1 | 8/2004 | Seki et al. | |
| 2004/0165552 A1 | 8/2004 | Kim | |
| 2005/0083873 A1 | 4/2005 | Yamamoto | |
| 2005/0117520 A1 | 6/2005 | Miyoshi | |
| 2005/0213682 A1 * | 9/2005 | Han et al. | 375/267 |
| 2008/0095039 A1 | 4/2008 | Joo et al. | |

FOREIGN PATENT DOCUMENTS

| | | |
|---|---|---|
| CN | 1285979 A | 2/2001 |
| JP | 9-238098 | 9/1997 |
| JP | 10-107685 | 4/1998 |
| JP | 11-027243 | 1/1999 |
| JP | 2001-156687 | 6/2001 |

(Continued)

OTHER PUBLICATIONS

Japanese Patent Office "Notification of Reasons for Refusal" for corresponding Japanese Patent Application No. 2007-510284, dispatched Feb. 23, 2010. English translation attached.

(Continued)

*Primary Examiner* — Eva Puente
(74) *Attorney, Agent, or Firm* — Myers Wolin, LLC

(57) ABSTRACT

A radio communication system that uses multiple antennas to transmit signals to a plurality of mobile terminals, and that measures the reception quality of each signal that is transmitted from each antenna on a transmitting side and received by the mobile terminal, determines a main antenna based on that reception quality for real-time communication, calculates multi-dimension correlation between the main antenna and other antennas, selects resources where the multi-dimension correlation is lower than a set value, feeds back data to the transmitting side indicating the main antenna, low correlation resources and reception qualities, designates antennas having resources of low correlation as diversity antennas, and performs diversity transmission from the transmitting side of signals to the mobile station using those diversity antennas and the main antenna.

17 Claims, 29 Drawing Sheets

FOREIGN PATENT DOCUMENTS

| | | |
|---|---|---|
| JP | 2001-511966 | 8/2001 |
| JP | 2001-251227 | 9/2001 |
| JP | 2002-26919 | 1/2002 |
| JP | 2002-223248 | 8/2002 |
| JP | 2002-290317 | 10/2002 |
| JP | 2003-204317 | 7/2003 |
| JP | 2004-112098 | 4/2004 |
| JP | 2004-194262 | 7/2004 |
| JP | 2004-248275 | 9/2004 |
| JP | 2004-363811 | 12/2004 |
| WO | WO 2002-091625 | 11/2002 |
| WO | 03/043245 | 5/2003 |

OTHER PUBLICATIONS

G.J. Foschini and M.J. Gans, "On Limits of Wireless Communications in a Fading Environment when using Multiply Antennas", 1998.

Siavashi M. Alamouti, "A Simple Transmit Diversity Technique for Wireless Communications" IEEE Journal Select Areas in Communications, vol. 16, No. 8, Oct. 1998.

Vahid Tarokh, "Space-Time Block Codes from Orthogonal Designs" IEEE Transactions. vol. 49, No. 5, Jul. 1999.

P.W. Wolniansky, "V-Blast: An Architecture for Realizing Very High Data Rates Over the Rich-Scattering Wireless Channel", Sep. 1998.

Hamid Jafarkhani, "A Quasi-Orthogonal Space-Time Block Code" IEEE Transactions on Communications, vol. 49, No. 1, Jan. 2001.

I. Emre Telatar, "Capacity of Multi-antenna Gaussian Channels" Jun. 1995.

3GPP TR 25.848 V4.0.0 (Mar. 2001), 3rd Generation Partnership Project; Technical Specification Group Radio Access Network; Physical layer aspects of UTRA High Speed Downlink Packet Access, (Release 4).

The State Intellectual Property Office of China "First Notification of Office Action" for corresponding Chinese Patent Application No. 200580049224.0, Date of Issue: May 17, 2010. English translation attached.

Japanese Patent Office "Notice of Reasons for Refusal" issued for corresponding Japanese Patent Application No. 2007-510284, dispatched Nov. 9, 2010. English translation attached.

\* cited by examiner (A)

(B) RECEIVED CPICH PLURALITY OF SYMBOLS

FIG. 29 PRIOR ART
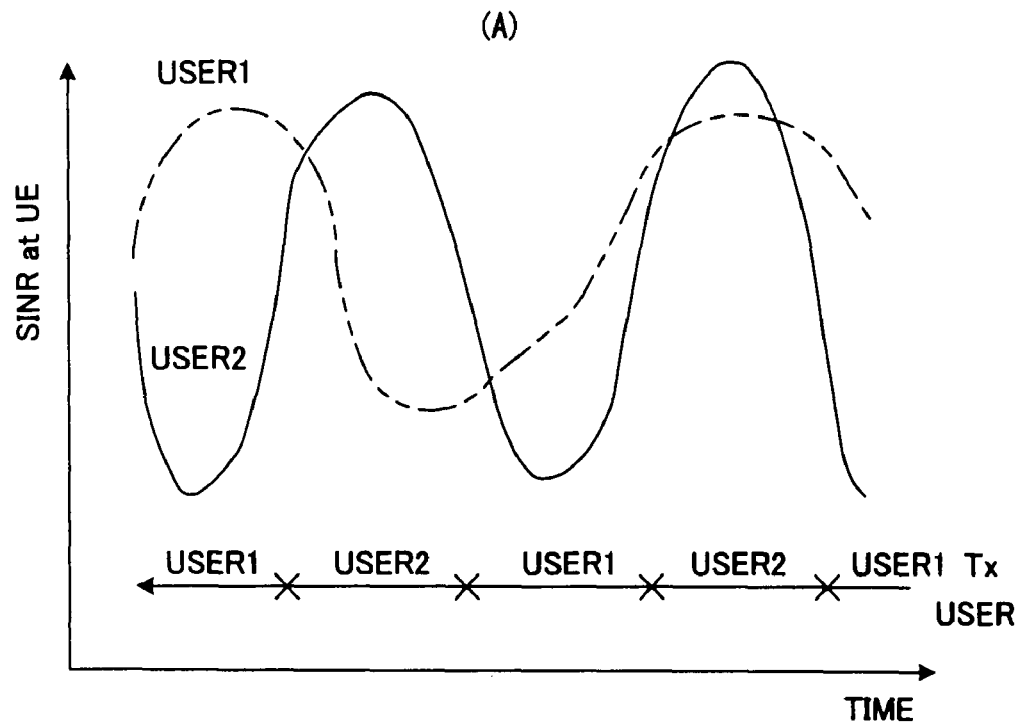
(A)
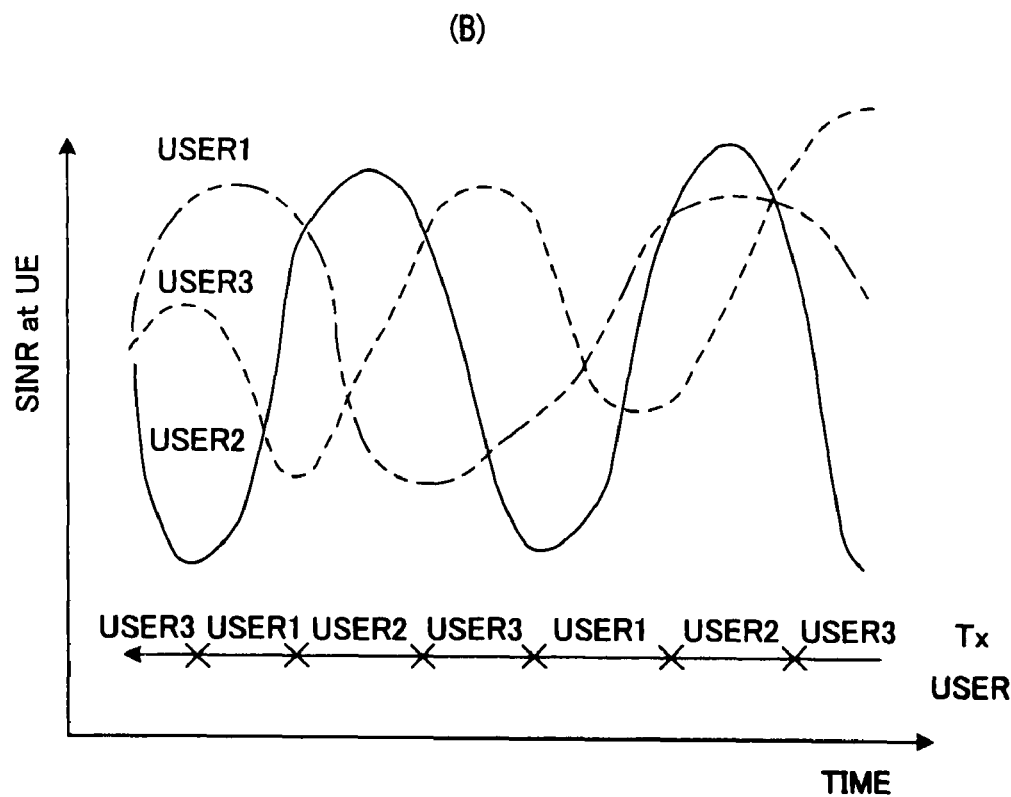
(B)

FIG. 37 PRIOR ART

| C1 | C2 | C3 | C4 | C5 | C6 | C7 | C8 |
|----|----|----|----|----|----|----|----|

+   +   ...

| C1(b) | C2(b) | C3(b) | C4(b) | C5(b) | C6(b) | C7(b) | C8(b) | ~6a |

⇩ PUNCTURED DECODING

| B1 | B2 | B3 | B4 | B5 | B6 | B7 | B8 | B9 | B10 | B11 | B12 | B13 | B14 | B15 | B16 | B17 | B18 |
|----|----|----|----|----|----|----|----|----|-----|-----|-----|-----|-----|-----|-----|-----|-----|
| C1 | C2 | C3 | C4 | C5 | C6 | C7 | 0  | 0  | 0   | 0   | 0   | 0   | 0   | 0   | C8  | 0   | 0   |

(a) COMBINATION BEFORE PUNCTURED DECODING

| C1 | C2 | C3 | C4 | ... | 0 | 0 | C8 | 0 | 0 |
|----|----|----|----|-----|---|---|----|---|---|

+   +   ...

| B1(b) | B2(b) | B3(b) | B4(b) | ... | B14(b) | B15(b) | B16(b) | B17(b) | B18(b) |

(b) COMBINATION AFTER PUNCTURED DECODING

FIG. 38 PRIOR ART

| C1 | C2 | C3 | C4 | C5 | C6 | C7 | C8 |
|---|---|---|---|---|---|---|---|

+  +  ...

| C1(b1) | C2(b1) | C3(b1) | C4(b1) | C5(b1) | C6(b1) | C7(b1) | C8(b1) | ~6a-1

| D1 | D2 | D3 | D4 | D5 | D6 | D7 | D8 |
|---|---|---|---|---|---|---|---|

+  +  ...

| D1(b2) | D2(b2) | D3(b2) | D4(b2) | D5(b2) | D6(b2) | D7(b2) | D8(b2) | ~6a-2

⇩ PUNCTURED DECODING

| B1 | B2 | B3 | B4 | B5 | B6 | B7 | B8 | B9 | B10 | B11 | B12 | B13 | B14 | B15 | B16 | B17 | B18 |
|---|---|---|---|---|---|---|---|---|---|---|---|---|---|---|---|---|---|
| C1 | C2 | C3 | C4 | C5 | C6 | C7 | D1 | D2 | D3 | D4 | 0 | D5 | D6 | 0 | C8 | D7 | D8 |

(a) COMBINATION BEFORE PUNCTURED DECODING

| C1 | C2 | C3 | C4 | ... | 0 | 0 | C8 | 0 | 0 |
|---|---|---|---|---|---|---|---|---|---|

+  +  ...  +                +

| B1(b) | B2(b) | B3(b) | B4(b) | ... | B14(b) | B15(b) | B16(b) | B17(b) | B18(b) |

↳6a

| 0 | 0 | ... | 0 | D5 | D6 | 0 | 0 | D7 | D8 |
|---|---|---|---|---|---|---|---|---|---|

+  +  ...                          +  +

| B1(b) | B2(b) | ... | B12(b) | B13(b) | B14(b) | B15(b) | B16(b) | B17(b) | B18(b) |

↳6a (b) COMBINATION AFTER PUNCTURED DECODING

FIG. 39 PRIOR ART (a)

| 1 |
|---|
| 1 |
| 1 |
| 1 |
| 1 |
| 1 |
| 1 |
| 0 |
| 0 |
| 0 |
| 0 |
| 0 |
| 0 |
| 0 |
| 0 |
| 1 |
| 0 |
| 0 |

PCP (b)

| 0 |
|---|
| 0 |
| 0 |
| 0 |
| 0 |
| 0 |
| 0 |
| 1 |
| 1 |
| 1 |
| 1 |
| 0 |
| 1 |
| 1 |
| 0 |
| 0 |
| 1 |
| 1 |

PCP'

MOBILE TERMINAL, RADIO COMMUNICATION APPARATUS AND RADIO COMMUNICATION METHOD

CROSS-REFERENCE TO RELATED APPLICATIONS

This is a continuation application of International Application Number PCT/JP2005/006053, which was filed on Mar. 30, 2005.

BACKGROUND OF THE INVENTION

The present invention relates to a mobile terminal, radio communication apparatus and radio communication method in a radio communication system that performs communication from multiple antennas, wherein according to the present invention a real-time communication (RT communication) is performed using a main antenna and other antennas that have no correlation with the main antenna to realize diversity transmission, thereby RT communication gain is obtained and the error rate in RT communication is lowered.

In an Internet service that uses a mobile communication system, a packet transmission that efficiently transmits signals having various qualities and transmission rates is very suitable. A characteristic of packet transmission is that signals are transmitted only when there is data from each user, and channels can be shared by a plurality of users, so radio resources can be used efficiently. Also, adaptive modulation, scheduling and retransmission are used as methods for performing transmission even more efficiently.

(a) Adaptive Modulation Method

The characteristic of radio propagation path is constantly changing, so it becomes necessary to transmit signals according to the state of the propagation path. As an example, is a method of controlling the transmission power. When the state of the propagation path is poor, the reception quality at a receiving station is maintained at a certain level by increasing the transmission power. However, in this method, the transmission power changes, so it is feasible that the interference characteristic will change with respect to another receiving station or adjacent cell.

Therefore, as another way of thinking is a method of keeping the transmission power constant and changing the modulation parameters (data modulation method, encoding rate, etc.) in accordance to the state of the propagation path. This method is called adaptive modulation (AMC: Adaptive Modulation Control). The data is generally modulated by various multi-value modulation methods (ex. binary-, QPSK-, 16QAM-, 64QAM-modulation method) and error correction is performed. The larger the value in the multi-value modulation method, and the closer the encoding rate R in error correction is to 1, the amount of data that is sent at one time becomes larger, and therefore the tolerance to transmission error becomes weak. When the state of the propagation path is good, by increasing the value in the multi-value modulation method and bringing the encoding rate nearer to 1, the amount of transmission data and the transmission throughput are increased. On the other hand, when the state of the propagation path is poor, by decreasing the value in the multi-value modulation method and making the encoding rate small, it is possible to decrease the amount of transmission data and to prevent an increase in transmission error rate. In a system that performs spreading frequency of data, such as in the code division multiple access method (CDMA), the signal spreading rate (also called process gain) can be used as the modulation parameter. By changing the modulation parameter according to the state of the propagation path, signal transmission that matches the transmission propagation state is possible, and as a result a rise in transmission error rate is suppressed and efficient transmission becomes possible.

(b) Scheduler

In a mobile communication system, when performing signal transmission to a plurality of users in a cell, it becomes important that radio resources are efficiently assigned to each user. In other words, at what time, by which channel, by what power and how long of a packet length the packet of a user is transmitted must be determined. The unit that performs this work is called a scheduler. In a scheduler, radio resources are assigned to each user based on various information. This information may include the propagation path state for each user, the priority of the users, frequency of the occurrence of data, the amount of data, and the like, with a different type of information being used according to the system. Also, which part of the radio resources and by which standard the resources are to be assigned differs according to the system. As a prior standard for assigning resources is PF (Proportional Fairness) of HSDPA (High Speed Downlink Packet Access) that is used in W-CDMA or the like. PF is a technique of noticing fluctuations in the propagation path due to fading and selecting a moment with little propagation path loss for transmission, while at the same time maintaining equivalent transmission opportunity. As the number of connected users increases, the transmission time that is assigned to a user decreases, however, it becomes more possible to select only moments of little propagation path loss for transmission, and thus it is possible to improve the throughput of the transmitting station. The gain that is selected only when there is a good state of this fading is called MUD (Multi-User Diversity) of the scheduler. In comparison with a RR (Round Robin) that simply assigns the transmission opportunity, PF is able to obtain MUD gain and greatly improve throughput.

FIG. 29 is a drawing for explaining assignment from the scheduler, where (A) shows assignment when there are two users, and (B) shows assignment when there are three users, with SINR at UE on the vertical axis being the reception SINR (Signal to Interference Noise Ratio) that is measured by the terminal, and Tx User along the horizontal axis being the destination user that is selected by the transmitting station based on that measured value. In comparing (A) and (B), when the number of users becomes 3, it can be seen that the period that transmission is assigned decreases, however, the transmission is executed using a better propagation state.

(c) Retransmission Method

There is a retransmission method ARQ (Automatic Repeat request) for retransmitting a packet for which transmission failed. The receiving station determines whether information of a received packet is accurately decoded, and notifies the transmitting side whether transmission is succeeded or failed (ACK/NACK). The transmitting station stores the data information of transmitted packets in a buffer, and when there is a notification that transmission failed, retransmits that packet. When there is notification that a packet was received successfully, the transmitting station deletes that packet data from the buffer. When performing communication such as Internet or data communication, a certain amount of delay is allowed, however accuracy is desired. In the case of this kind of traffic, by increasing the maximum number of retransmissions, it is possible to perform communication having little packet deletion. On the other hand, in the case of traffic during real-time communication (RT communication) such as a phone call, a certain amount of packet deletion is allowed, however, the maximum number of retransmissions is set to '0'. In order to further improve the reception quality of a retransmitted signal, there is a retransmission combination method HARQ (Hybrid Automatic Repeat reQuest) that combines data on the receiving side. On the receiving side, when reception fails, data of the packet that contains error is stored in a buffer. When the retransmitted packet is received, it is combined with the data stored in the buffer. By combining data, reception quality is improved, and as the number of retransmissions increases, the degree of improvement becomes high and the success rate of packet reception increases.

In a packet transmission system in mobile communication, by using the techniques described above, it is possible to use radio resources efficiently, to perform packet transmission that is suitable for each user or traffic characteristics, and to perform packet transmission that is suitable for the objective of the system provider.

(d) Conventional Packet Transmission System

Transmission Side Signal Modulation Unit and Receiving Side Signal Demodulation Unit FIG. 30 is a drawing showing an example of the construction of a transmission side signal modulation unit in a conventional packet transmission system, and FIG. 31 is a drawing showing an example of the construction of a receiving side signal demodulation unit.

In the transmission side signal modulation unit shown in FIG. 30, the modulation method, encoding rate and spreading rate are designated by the modulation parameters. Error correction and encoding is performed for the transmission data by a turbo encoding unit 3a using turbo code, for example. In the turbo encoding unit, the encoding rate is fixed (for example, R=1/3). In a punctured encoding unit 3b, several punctured code patterns are used to achieve a requested encoding rate (for example, R=3/4). In a data modulation unit 3c, data modulation is performed according to a modulation method (multi-value modulation method). Typically, the modulation method is QPSK, 16QAM, 64QAM, etc. In a spreading unit 3d, the input signal is spread according to the spreading rate. In spreading, there is a method of spreading in the time direction and a method of spreading in the frequency direction.

As shown in FIG. 31, the receiving side signal demodulation unit has construction that performs retransmission combination before punctured decoding ((A) of FIG. 31), or has construction that performs retransmission combination after punctured decoding ((B) of FIG. 31). In FIG. 31, an inverse spreading unit 4a performs inverse spreading according to the spreading rate. Next, a data demodulation unit 4b performs data demodulation according to a modulation method. In the case of a retransmitted packet, a retransmission combination unit 4c performs combination processing with the same packet data received before. By doing this, it is possible to obtain higher reception quality. As described above, for retransmission combination there are two constructions, in the first construction the combination is performed before punctured decoding, and in the second construction the combination is performed after punctured decoding. A punctured decoding unit 4d performs punctured decoding according to the encoding rate, and a turbo decoding unit 4e performs turbo decoding.

Punctured Decoding

FIG. 32 is a drawing showing the construction of the punctured decoding unit 4d, and corresponds to the punctured decoding unit shown in (B) of FIG. 31. The punctured decoding unit 4d comprises a punctured code pattern generation unit 5a that generates a punctured code pattern PCP that corresponds to the encoding rate, and a data buffer 5b. The signal RD after data demodulation is stored in the data buffer 5b for the number of codes '1' in the punctured code pattern PCP. The punctured code pattern PCP differs according to encoding rate, and so the buffer length also differs. FIG. 33 shows an example of a buffer length of 4 (the number of '1's in the punctured code pattern PCP is 4). The stored signal RD is written to the positions of code '1' of the punctured code pattern PCP, to output the signal RD' after punctured decoding.

Construction Of the Retransmission Combination Unit on the Receiving Side

FIG. 34 is a drawing showing the construction of the retransmission combination unit on the receiving side. A buffer unit 6a saves the packet for which transmission failed together with the packet number. A buffer data extraction unit 6b makes reference to the packet number and obtains the packet data that is to be combined with the retransmitted packet from the buffer 6a. In the case where a received packet is not a retransmitted packet, or in other words, when the packet is a new packet, a retransmission combination unit 4c lets the packet pass as is and inputs it to a turbo decoding unit 4e, and in the case where the packet is a retransmitted packet, the retransmission combination unit 4c combines that packet with packet data read from the buffer 6a and inputs the result to the turbo decoding unit 4e. The turbo decoding unit 4e performs turbo decoding on the input data, and a CRC check unit 4f uses the decoded data to execute a CRC check operation and checks whether there is any error in the decoded data, and when there is no error in the data, outputs that data as received data and generates an ACK signal, and when there is error, generates a NACK signal. When a retransmitted packet is received and an ACK signal is generated, a data/information storage unit 6c deletes that packet from the buffer 6a, and when a NACK signal is received, stores the retransmitted combined data in the buffer 6a together with the packet number.

Signal Modulation/Signal Demodulation

FIG. 35 shows an example of signal modulation on the transmitting side. Here, the modulation method is 16QAM, and the encoding rate R is 3/4. Taking the transmission data to be A, 6 bit data A1 to A6 is considered. When the encoding rate of turbo encoding is taken to be 1/3, the encoded data becomes B1 to B18. In a punctured code pattern PCP for an encoding rate of 3/4, of the 18 bits, the 8 bits becomes '1'. The data B1 to B7 and B16 corresponding to the bit position of the pattern PCP where code is '1' becomes the data after punctured encoding, and is output as C1 to C8 (rate matching). The original 6 bit data becomes 8 bit data, so an encoding rate of 3/4 is accomplished. In data modulation, 16QAM modulation is performed, and the data C1 to C8 becomes the data E1, E2. The data E1, E2 is then spread according to the spreading rate.

FIG. 36 shows an example of signal demodulation on the receiving side. The flow is the opposite of that shown in FIG. 35. In punctured decoding, data C1 to C8 is written at bit positions of the punctured code pattern where code is '1', and as a result turbo code with an encoding rate of 1/3 is obtained (de-rate matching). By performing turbo decoding on the data after punctured decoding, the original 6-bit data A1 to A6 is decoded.

Retransmission Combination

Chase combination and IR combination are typically used as retransmission combination. Here, these two methods will be explained. FIG. 37 is a drawing that explains Chase combination, where (a) of FIG. 37 is a drawing that explains Chase combination before punctured decoding, and (b) of FIG. 37 is a drawing that explains Chase combination after punctured decoding. The reference numbers will be used according to the example described above.

In combination before punctured decoding, the decoded data C1 to C8 is combined with the data C1($b$) to C8($b$) in the buffer 6$a$ as shown in (a) of FIG. 37, and for example is combined at a maximum ratio. The retransmitted combined 8 bit data is substituted into the positions (B1 to B7, B16) where the code of punctured code packet PCP (see FIG. 36) is '1', after which punctured decoding is performed and input to the turbo decoding unit 4$e$.

In combination after punctured decoding, after the decoded data C1 to C8 is substituted into the positions (B1 to B7, B16) where the code of punctured code packet PCP (see FIG. 36) is '1' as shown in (b) of FIG. 37, the data is combined with the data B1($b$) to B18($b$) inside the buffer 6$a$. In (a) and (b) of FIG. 37, the construction of the buffer is different, however the effect is the same.

FIG. 38 is a drawing that explains IR combination, where (a) of FIG. 38 is a drawing that explains IR combination before punctured decoding, and (b) of FIG. 38 is a drawing that explains IR combination after punctured decoding.

In IR combination, encoding is performed by a different punctured code pattern for each retransmission. Here, the number of patterns is taken to be two. When two patterns are used, the pattern used in the first transmission is different from that used in the first retransmission. In the second retransmission, the same pattern as the first transmission is used. Data combination is performed only when using the same pattern.

In combination before punctured decoding as shown in (a) of FIG. 38, punctured encoding is performed on the data of the first transmission and data of the second, fourth and sixth retransmissions using the same pattern PCP (see (a) of FIG. 39), so data C1 to C8 is combined with the data stored in a first buffer 6$a$-1, and then stored again in the buffer 6$a$-1. Punctured encoding is performed for the data of the first, third and fifth retransmission using a punctured code pattern PCP' that is different from the pattern PCP (see (b) of FIG. 39), so that data D1 to D8 is combined with data stored in a different buffer 6$a$-2, and then stored again in the buffer 6$a$-2. Through punctured decoding, each of the combined data C1 to C8 and the combined data D1 to D8 is respectively written at bit positions of each punctured code pattern PCP, PCP' where code is '1' and puncture decoded. Here, Ci indicates the data of the first pattern, and Di indicates the data of the second pattern. The puncture decoded data is then input to the turbo decoding unit and turbo decoded.

In combination after punctured decoding shown in (b) of FIG. 38, after each retransmission, data is puncture decoded using each pattern PCP, PCP' alternatively and then combined with the data in the buffer 6$a$. Here, only data having the same pattern are combined. Data C1 to C8 that are decoded using the first pattern PCP in the first transmission and the second, fourth, sixth . . . retransmissions, are combined with data (B1($b$), B2($b$) to B7($b$), B16($b$)) of corresponding positions in the buffer 6$a$. Data D1 to D8 that are decoded using the second pattern in the first, third, fifth . . . retransmissions are combined with data (B8($b$) to B11($b$), B13($b$) to B14($b$), B17($b$) to B18($b$)) of corresponding positions in the buffer 6$a$. The puncture decoded data is then input to the following turbo decoding unit and turbo decoded.

(e) MIMO Multiplexed Transmission

As a method for greatly improving the throughput of one on one communication there is MIMO (Multi Input Multi Output) multiplexed transmission.

FIG. 40 is a drawing showing the construction of a MIMO multiplexed transmission system, where TRX is a transmitting station, and REC is a receiving station. The same number of data streams $D_0$ to $D_{M-1}$ as the number of transmission antennas M go through processing such as data modulation, D/A conversion, orthogonal modulation, frequency UP conversion, and the like by respective transmission apparatuses $TRX_0$ to $TRX_{M-1}$, and are transmitted from respective transmission antennas $ATT_0$ to $ATT_{M-1}$. Signals that are transmitted from antennas $ATT_0$ to $ATT_{M-1}$, that are arranged so that they have no correlation one another pass through independent fading channels $h_{nm}$ (m=0 to M−1, n=0 to N−1), and after being spatially multiplexed, are received by N number of reception antennas $ATR_0$ to $ATR_{N-1}$. Signals that are received by the reception antennas undergo processing such as frequency DOWN conversion, orthogonal detection, A/D conversion and the like by receiving apparatuses $REC_0$ to $REC_{N-1}$, to generate received data streams $y_0$ to $y_{N-1}$. Each of the received data streams are in a multiplexed form of M number of transmission data streams, so in a data processing unit DPU, by performing signal processing on all of the received data streams, the transmission data streams $D_0$ to $D_{M-1}$ can be separated out and reproduced.

As algorithms for processing signals to separate out transmission data streams $D_0$ to $D_{M-1}$ from the received signals there are linear algorithms such as ZF (Zero-Forcing) or MMSE that use an inverse matrix of a channel correlation matrix (See A. van Zelst, "Space Division Multiplexing Algorithms", 10th Mediterranean Electrotechnical Conference 2000, MELECON 2000, Cyprus, May 2000, Vol. 3, pp. 1218-1221) and there are non-linear algorithms such as BLAST (Bell Laboratories Layered Space-Time) (See P. W. Wolniansky, G. J. Foschini, G. D. Golden, R. A. Valenzuela "V-BLAST: An Architecture for Realizing Very High Data Rates Over the Rich-Scattering Wireless Channel", Proc. 1998 Int. Symp. On Advanced Radio Technologies, Boulder, Colo., 9-11 Sep. 1998). Methods such as MLD (Maximum Likelihood Decoding) are also known that do not use inverse matrix calculation of a correlation matrix (See Geert Awater, Allert. van Zelst and Richard. van Nee, "Reduced Complexity Space Division Multiplexing Receivers," in proceedings IEEE VTC 2000, Tokyo, Japan, May 15-18, 2000, vol. 2, pp. 1070-1074). The MLD algorithm will be explained below. By expressing transmission data streams by an M-dimensional complex matrix and received data streams by an N-dimensional complex matrix, the following relationship is formed.

$$Y = H \cdot D$$

$$H = \begin{bmatrix} h_{00} \cdot h_{01} \ldots h_{0M-1} \\ h_{10} \ldots h_{1M-1} \\ \ldots \\ h_{N-10} \ldots h_{N-1M-1} \end{bmatrix}$$

$$D = [D_0 \cdot D_1 \ldots D_{M-1}]^T$$

$$Y = [y_0 \cdot y_1 \ldots y_{N-1}]^T$$

The MLD algorithm is a method that does not use inverse matrix calculation of a correlation matrix, and a transmission data stream (transmission vector) D is estimated by the following equation.

$$\hat{D} = \arg \min \| Y - H \cdot D \|^2$$

Here, by taking the number of signal point arrangements of modulated data that are input to each of M number of antennas as Q, there exits $Q^M$ number of combinations of transmission vectors D. In QPSK, Q=4, in 16QAM, Q=16, and in 64QAM, Q=64. The MLD algorithm is a method in which $Q^M$ number of transmission vector candidates (replicas) are generated, and the calculation of the equation above is performed, and as a result, the smallest replica is estimated to be input data.

Even in MIMO multiplexed transmission, a scheduler adopting a PF is being investigated as a method for improving throughput while maintaining equivalent transmission opportunity among a plurality of users. These investigated techniques focus on improvement of throughput, and symbols for which error occurs are compensated for by retransmission techniques such as retransmission symbol combination type HARQ.

(f) RT (Real-Time) Communication

As future technology, VoIP (Voice over IP) is currently being considered. The VoIP is a kind of voice telephone real-time communication in IP network and does not use a line switching apparatus. That is, VoIP is a method that divides up compressed encoded audio data into packets and transmits the packets, and performs communication via an Internet network router. In addition, VoIP is not a connection type but connectionless type, as well as it provides flexibility of avoiding trouble and maintenance is relatively easy, so it is a very powerful technique. Another example of RT communication is online games and the like.

(g) Problems

In RT communication, it is necessary to perform communication within a fixed period of time, and retransmission delay due to HARQ that is performed when an error in a packet occurs is not allowed. The PF technique in one-on-one communication that includes the MIMO multiplexed transmission premises retransmission technology and is intended to attain equality of transmission opportunity and improvement of throughput. So there is a problem in that it is not suitable for RT communication that does not allow communication delay or retransmission.

There is prior art of increasing the diversity gain during retransmission based on line quality in a case where change over time of the propagation environment of radio signals is gradual (JP 2004-112098 A). However, during RT communication that does not allow communication delay or retransmission, this prior art does not lower the error rate to a quality that is allowed in RT communication, and does not make it possible to perform communication within a fixed period of time.

SUMMARY OF THE INVENTION

Taking the aforementioned problems into consideration, the object of the present invention is to provide a communication method and communication apparatus capable of performing communication within a fixed period of time, and to lower the error rate to a quality that is allowed in RT communication even when a retransmission technique is not used.

The present invention accomplishes the object described above by a mobile terminal in a radio communication system that uses multiple antennas to transmit signals to a plurality of mobile terminals, comprising: a reception quality measurement unit that measures the reception quality of each signal that is transmitted from each antenna and received by the mobile terminal; a main antenna determination unit that determines a main antenna based on that reception qualities in real-time communication; a multi-dimension correlation calculation unit that calculates multi-dimension correlation between the main antenna and other antennas; a low correlation resource selection unit that selects resources where the multi-dimension correlation is lower than a set value; and a feedback unit that feeds back data indicating the main antenna, low correlation resources and reception qualities to the transmitting side so that it is possible to designate antennas forming the resources of low correlation as diversity antennas, and to perform diversity transmission of signals to the mobile terminal using those diversity antennas and main antenna.

Also, the present invention accomplishes the object described above by a mobile terminal in a radio communication system that uses multiple antennas to perform MIMO transmission to a mobile terminal, comprising: a reception quality measurement unit that measures the reception quality of each signal that is transmitted from each antenna and received by the mobile terminal; a main antenna determination unit that determines plural main antennas forming low correlation with each other based on the reception qualities; a multi-dimension correlation calculation unit that calculates multi-dimension correlation between each main antenna and other antennas; a low correlation resource selection unit that selects resources for each main antenna where the multi-dimension correlation is lower than a set value; and a feedback unit that feeds back data that indicates each of the main antennas, the low correlation resources for each of the main antennas and said reception qualities to the transmitting side so that it is possible to designate antennas having the resources of low correlation as diversity antennas, and to perform transmission of signals to the mobile station using those diversity antennas and the plurality of main antennas.

Moreover, the present invention accomplishes the object described above by a radio communication apparatus that uses multiple antennas to transmit signals to a plurality of mobile terminals, comprising: a receiving unit that receives data from a mobile terminal identifying resources where multi-dimension correlation between a main antenna and other antennas is lower than a set value; a scheduler that determines antennas forming the low correlation resources to be diversity antennas when the communication rate of the main antenna is less than a requested communication rate for real-time communication; and a diversity transmission unit that uses the main antenna and diversity antennas to perform diversity transmission of identical data to the mobile terminal.

Furthermore, the present invention accomplishes the object described above by a MIMO radio communication apparatus that uses multiple antennas to transmit signals to a plurality of mobile terminals, comprising: a receiving unit that receives data from a mobile terminal identifying plural main antennas and resources where multi-dimension correlation between each main antenna and other antennas is lower than a set value; a scheduler that selects main antennas so that the total communication rate of the selected main antennas is larger than a requested communication rate in real-time communication, and determines antennas forming the resources of low correlation with respect to said selected main antennas as diversity antennas; and a transmission unit that transmits identical data from the main antennas and diversity antennas.

BRIEF DESCRIPTION OF THE DRAWINGS

FIG. 29 is a drawing explaining the assignment of a scheduler.

FIG. 37 is a drawing explaining Chase combination.

FIG. 38 is a drawing explaining IR combination.

FIG. 39 is a drawing explaining a punctured code pattern.

DESCRIPTION OF THE PREFERRED EMBODIMENTS

(A) Overview of the Invention

Multiple Antenna Communication

The present invention makes it possible during RT communication to always complete RT communication within a fixed period without performing retransmission control ARQ. But by doing this, the MUD (Multi-Use Diversity) gain decreases and the error rate increases. Therefore, a mobile terminal, radio communication apparatus and radio communication method are proposed in which a scheduler that performs transmission diversity is used to obtain gain greater than the decreased MUD gain, and to lower the error rate to a quality allowable for RT communication. In other words, in a radio communication system that perform communication from multiple antennas, the present invention performs RT communication from a main antenna, and uses antennas that have no correlation with the main antenna to obtain RT communication gain by performing diversity transmission and to lower the error rate of the RT communication.

Figure 1:
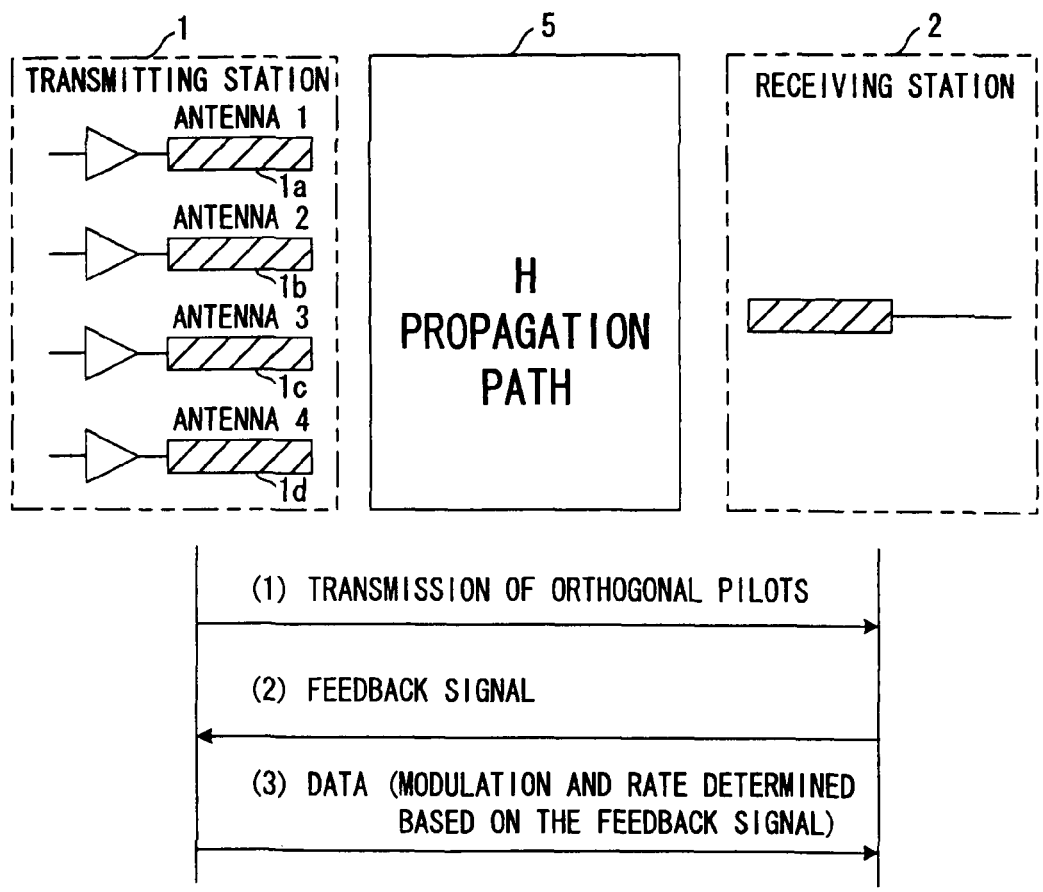
FIG. 1 is a drawing showing an overview of adaptive modulation of multiple antennas.

FIG. 1 is a drawing showing an outline of adaptive modulation for multiple antennas, where 1 is a transmitting station (base station) and 2 is a receiving station (mobile terminal). As shown in (1) of FIG. 1, in order to know information about the propagation path 5 (estimated propagation path value), the transmitting station 1 orthogonalizes pilot signals from the antennas 1a to 1d and transmits them to the receiving station 2. Orthogonalization is performed so that interference is not mixed in with the pilot symbols, where methods such as code multiplexing that uses different orthogonal code for each antenna, time multiplexing that uses different timing for each antenna, and frequency multiplexing that uses different sub carriers for each antenna are feasible.

Figure 2:
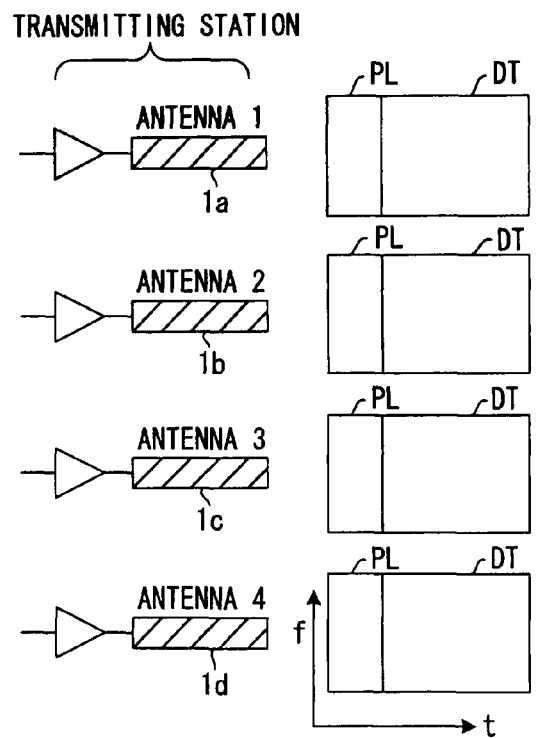
FIG. 2 is a drawing explaining orthogonal code multiplexing of pilots.

FIG. 2 is a drawing explaining orthogonal code multiplexing of pilots, where time division multiplexing is performed for a pilot PL and data DT for each slot. The pilot signals PL that are transmitted from the antennas 1a to 1d are multiplied by an orthogonal sequence that is found from a Hadamard matrix, and they can be separated on the receiving side. The spreading direction is determined such that spreading is performed in the direction of highest correlation of the frequency and time in order to maintain orthogonality. By making the signals completely orthogonal during reception, it is possible to make the S/N of the pilots the highest by combining and averaging symbols.

Figure 3:
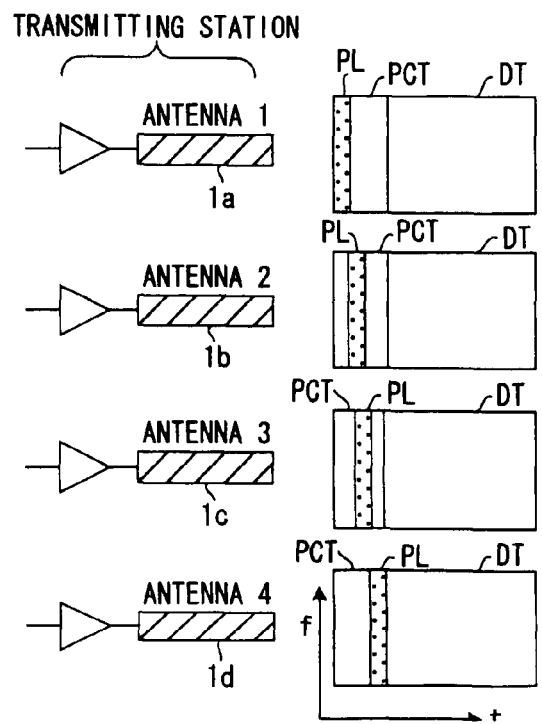
FIG. 3 is a drawing explaining time division multiplexing.
Figure 4:
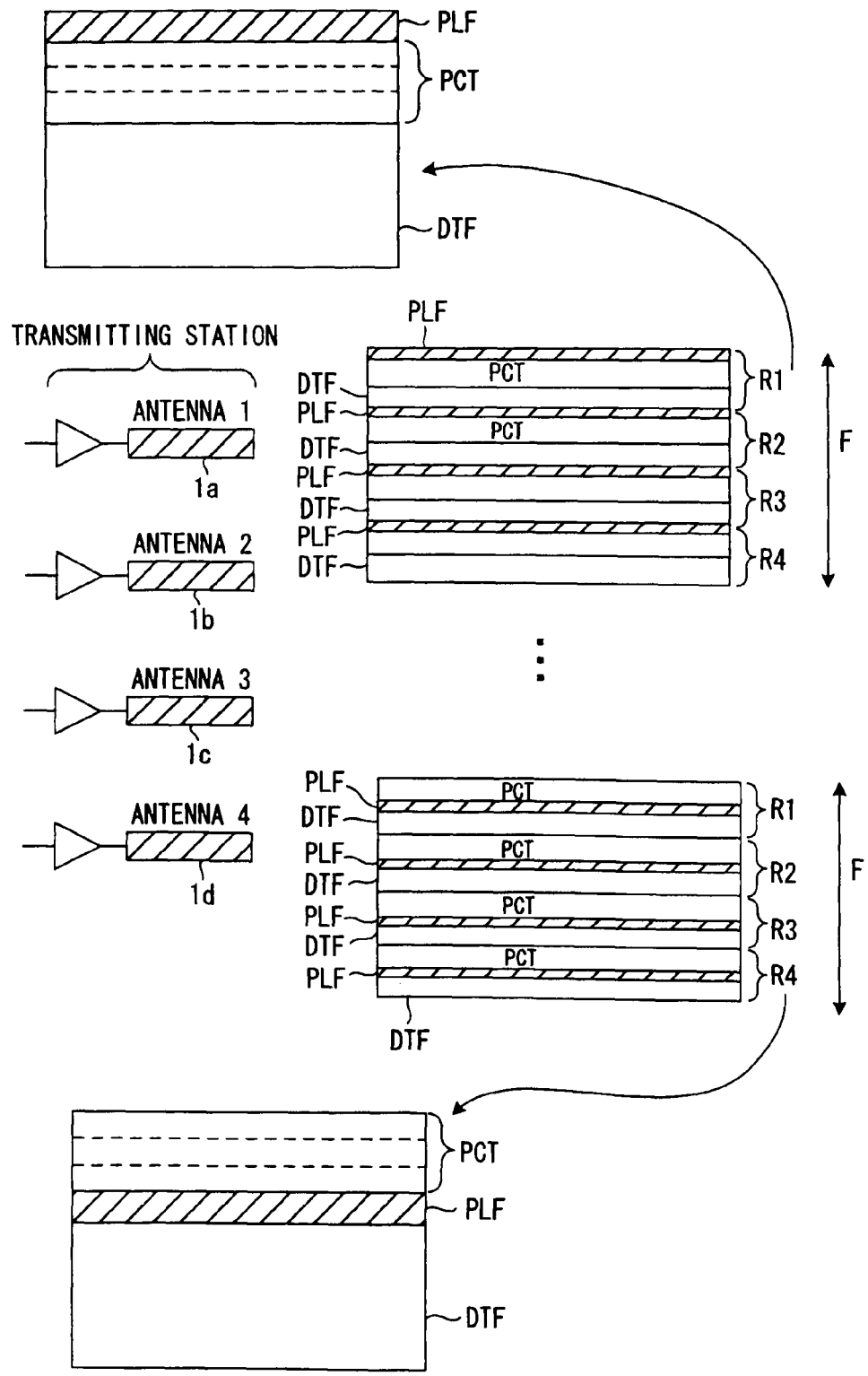
FIG. 4 is a drawing explaining frequency multiplexing.

FIG. 3 is a drawing explaining time division multiplexing, where together with performing time division multiplexing of pilots and data for each slot, the multiplexing time of the pilots PL is shifted for each antenna so there is no overlapping. PCT is the period during which data is not transmitted by puncture. FIG. 4 is a drawing explaining frequency multiplexing, where the frequency region F is divided into four regions (R1 to R4), and in each divided region R1 to R4, frequency multiplexing is performed for the data frequency region DTF and pilot frequency region PLF, and for each antenna the pilot frequency region PLF is made so that there is no overlapping. PCT is the frequency region in which data is not transmitted by puncture.

Figure 5:
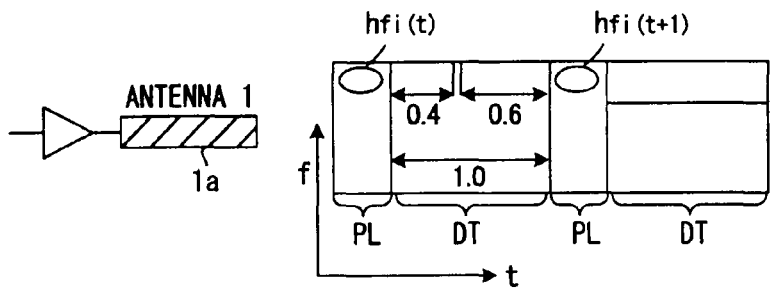
FIG. 5 is a drawing explaining channel estimation by linear interpolation.

The time division multiplexing and frequency multiplexing methods are used when orthogonality has the highest priority. Also, the propagation paths for time and frequency regions in which there are no pilots can be interpolated and estimated on the receiving side using a technique such as linear interpolation. FIG. 5 is a drawing explaining estimation of a propagation path by linear interpolation, and shows the case in which the orthogonal code multiplexing shown in FIG. 2 is used for multiplexing of the pilots PL. Also, orthogonal encoding is performed assuming that the correlation of the time regions is very high. Therefore, in FIG. 5, after performing estimation for each propagation path using the pilots at the start of each slot, the S/N is increased by averaging the estimated values of a plurality of time adjacent pilot symbols. In this way, the estimated propagation path value for a pilot at the start of a slot is expressed as $hf_{fi}(t)$. Therefore, adjacent slots can be expressed as $h_{fi}(t+1)$. Here, i is the sub carrier number. When the time that data occupies a slot is normalized to be 1.0, then the data to be demodulated is taken to be located at a position 0.4 from the pilot of the current slot (at a position 0.6 from the next slot). By doing so, the estimated value of the propagation path for demodulating this data can be expressed through linear interpolation as the following.

$$h_{fi}(t+n\tau) = \frac{1}{\frac{1}{0.4}+\frac{1}{0.6}}\left\{\frac{1}{0.4}h_{fi}(t)+\frac{1}{0.6}h_{fi}(t+1)\right\}$$

Furthermore, when it is necessary to improve S/N, combining adjacent sub carriers having high correlation by the following equation is also possible.

$$\bar{h}_{fi}(t+n\tau) = \frac{1}{\sum_{j=i-1}^{i+1}1}\sum_{j=i-1}^{i+1}h_{fj}(t+n\tau)$$

In this way, it is possible to estimate propagation paths with good accuracy.

By decoding the orthogonal transmitted pilots on the receiving side and comparing them with a reference pilot on the receiving side, it is possible to estimate fluctuation in the propagation path from the transmitting antenna to the receiving antenna. Using that estimated propagation path value, it is possible to calculate the correlation between transmitting antennas (spatial correlation), time correlation, frequency correlation and multidimensional correlation of the combination of these (this will be described later). Spatial correlation is correlation between signals that are received from two antennas in the case where identical signals are input to two antennas of interest, and the position of one of the antennas is changed; time correlation is correlation between signals that are received from two antennas in the case where the phase of one signal is changed; and frequency correlation is the correlation between signals that are received from two antennas in the case where the frequency of one signal is changed.

Figure 6:
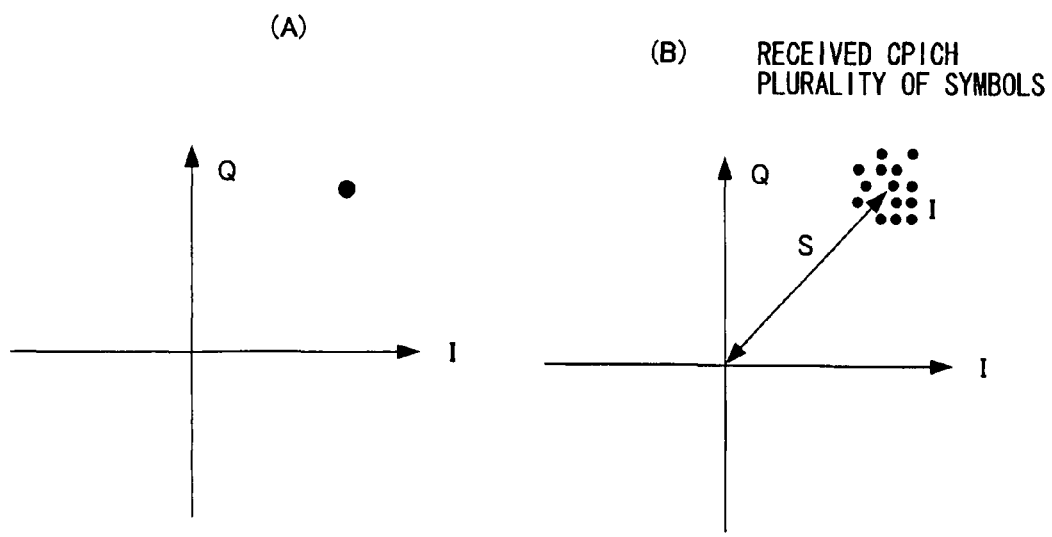
FIG. 6 is a drawing explaining SINR calculation.

Also, as shown in (A) of FIG. 6, on the transmitting side the constellation of the pilot symbols is in a specified position in the I-Q complex plane. However, as shown in (B) of FIG. 6, on the receiving side, the constellation of pilots that are affected by noise is scattered. The average value of the received pilots is the signal component S, and the size of variation from the average becomes the interference component and noise component (I+N), so the ratio of the signal components and the interference component (I+N) becomes SINR for a pilot of a certain frequency band at certain timing of the antenna. When there is a plurality of receiving antennas, the multi-dimension correlation is weighted and averaged among the receiving antennas, and the obtained value is taken to be the average multi-dimension correlation; and it is also possible to find the SINR after maximum ratio combining (MRC) or minimum mean square error (MMSE) combining among receiving antennas.

From the above, after calculating the SINR from the pilot signal, the receiving station 2 (FIG. 1) creates a feedback signal in (2) of FIG. 1 and notifies the transmitting station 1. The feedback signal includes estimated propagation path values or multi-dimension correlation calculated from them, and the SINR that expresses the reception quality or propagation information (CQI) that corresponds to it, and is transmitted to the transmitting station. Based on the transmitted feedback signal, the transmitting station 1 performs scheduling with the amount of data stored for that user and the distribution of resources among a plurality of users taken into consideration, determines the transmitting antenna, transmission timing, frequency band, and modulation and encoding methods, and determines the communication rate according to these. Next, the transmitting station 1 transmits data to the receiving station 2 using the communication method determined by scheduling. Since the receiving side does not know the transmitting antenna, transmitting timing, frequency band, modulation and encoding method, and diversity branch, the transmitting station 1 must notify the receiving station 2 of these using a common notification channel (broadcast channel) beforehand.

RT Communication

Figure 7:
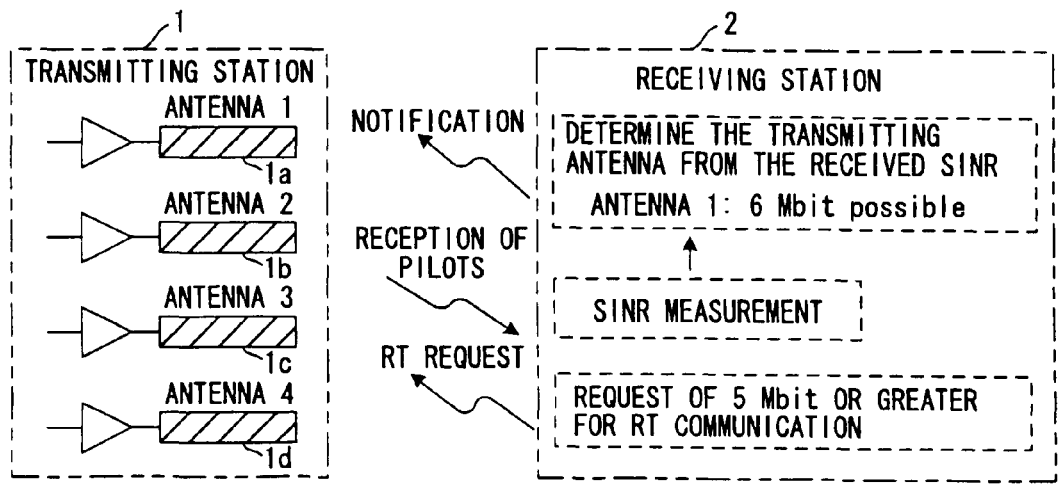
FIG. 7 is a drawing explaining the operation of RT communication.

Next, FIG. 7 will be used to explain a packet scheduler for RT communication. In RT communication the frequency that requests data for each service of an executed application and the amount of the data are determined. The desired service rate is determined by the transmitting side or the receiving side. For example, when VoIP having a certain quality (64 kbps) is requested and transmitted from the transmitting side, the receiving side must receive that. Also, on the receiving side, it is possible to request an online game having high image quality (20 Mbps).

In FIG. 7 an example is shown in which the receiving station 2 requests the transmitting station to perform RT communication at 5 Mbits every 0.2 sec. The receiving station 2 uses the SINR of the pilot for each resource (spatial resource of the antennas, time resource and frequency resource) as judgment material, and the set of the antenna, frequency band and time having the highest SINR is obtained and the antenna is called the main antenna.

Figure 8:
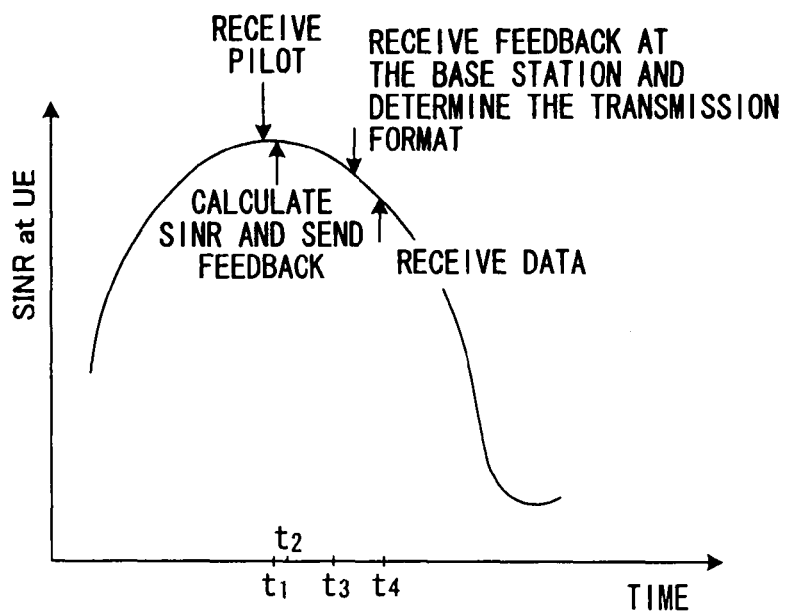
FIG. 8 is a drawing explaining deterioration due to feedback delay in AMC (Adaptive Modulation and Coding method).

In FIG. 7, antenna 1a is the main antenna, and from the SINR value it is estimated that a request up to a maximum of 6 Mbits is possible, which satisfies the request quality of 5 Mbits. Here, the reason why it is estimated and not asserted is that the propagation environment changes due to back and forth propagation delay that reflects the feedback. Moreover, when the propagation environment actually changes in an adverse direction, error occurs in the transmitted information data, and retransmission as well as demodulation is not in time, there is a possibility that communication will be interrupted. FIG. 8 is a drawing explaining deterioration due to feedback delay in AMC (adaptive modulation and coding method), where the SINR of orthogonal pilots received by the receiving station is calculated after orthogonal decoding and estimation of the propagation path are performed, so delay in calculation occurs. This SINR information is fed back to the transmitting station, however, and propagation path delay occurs. The transmitting station performs AMC of the data based on the SINR of the timing that the pilot is received. That data suffers a propagation path delay again and is received by the receiving station. From FIG. 8 it can be seen that there is a possibility for fluctuation of the propagation path due to delay from the timing when a pilot is received until data on which the SINR is reflected is received.

Figure 9:
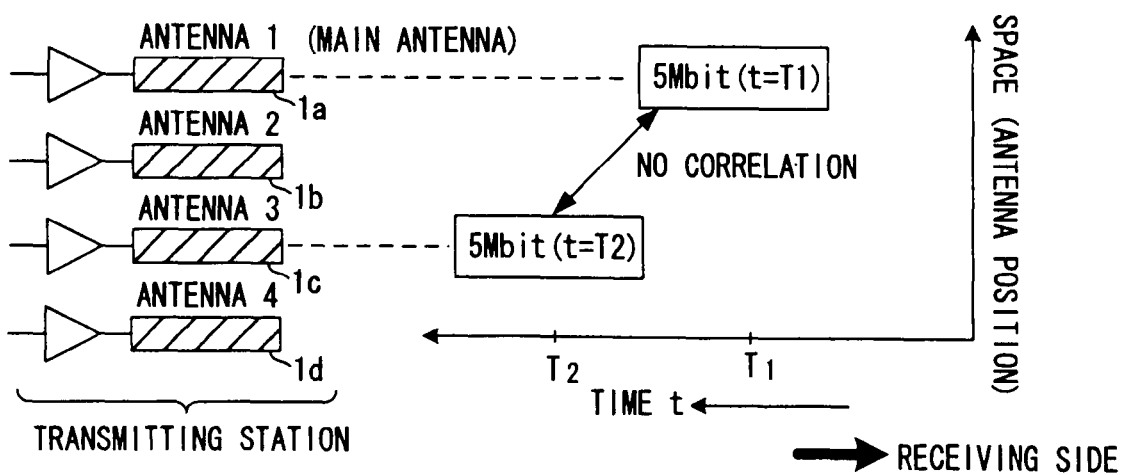
FIG. 9 is a drawing explaining application of diversity to a packet scheduler for RT communication in order to greatly reduce the probability of instantaneous interruption in communication.

FIG. 9 is a drawing explaining the case in which diversity is applied to a packet scheduler for RT communication in order to greatly reduce the probability of instantaneous interruption of communication. The main antenna 1a transmits 5 Mbits, and on the basis of the antenna resource/time resource/frequency resource of the main antenna, the multi-dimension correlation of a combination of spatial correlation, time correlation and frequency correlation is calculated, and part of the resource where there is no correlation with the main antenna is used to perform diversity transmission of the same packet. In the example shown in FIG. 9, the resource of time band T2 of antenna 1c has no correlation with the main antenna 1a. Therefore, by performing diversity transmission of the same packet from the main antenna 1a and the antenna 1c, the probability of instantaneous interruption of communication is greatly decreased as well as the error rate is decreased. Here, the same packet is transmitted, however, it is also possible to obtain encoding gain by transmitting the same symbols using different encoding as in the case of retransmission control IR. In order to be more easily understood, FIG. 9 shows the state of diversity transmission for two dimensions, time and space, and only one frequency band.

Figure 10:
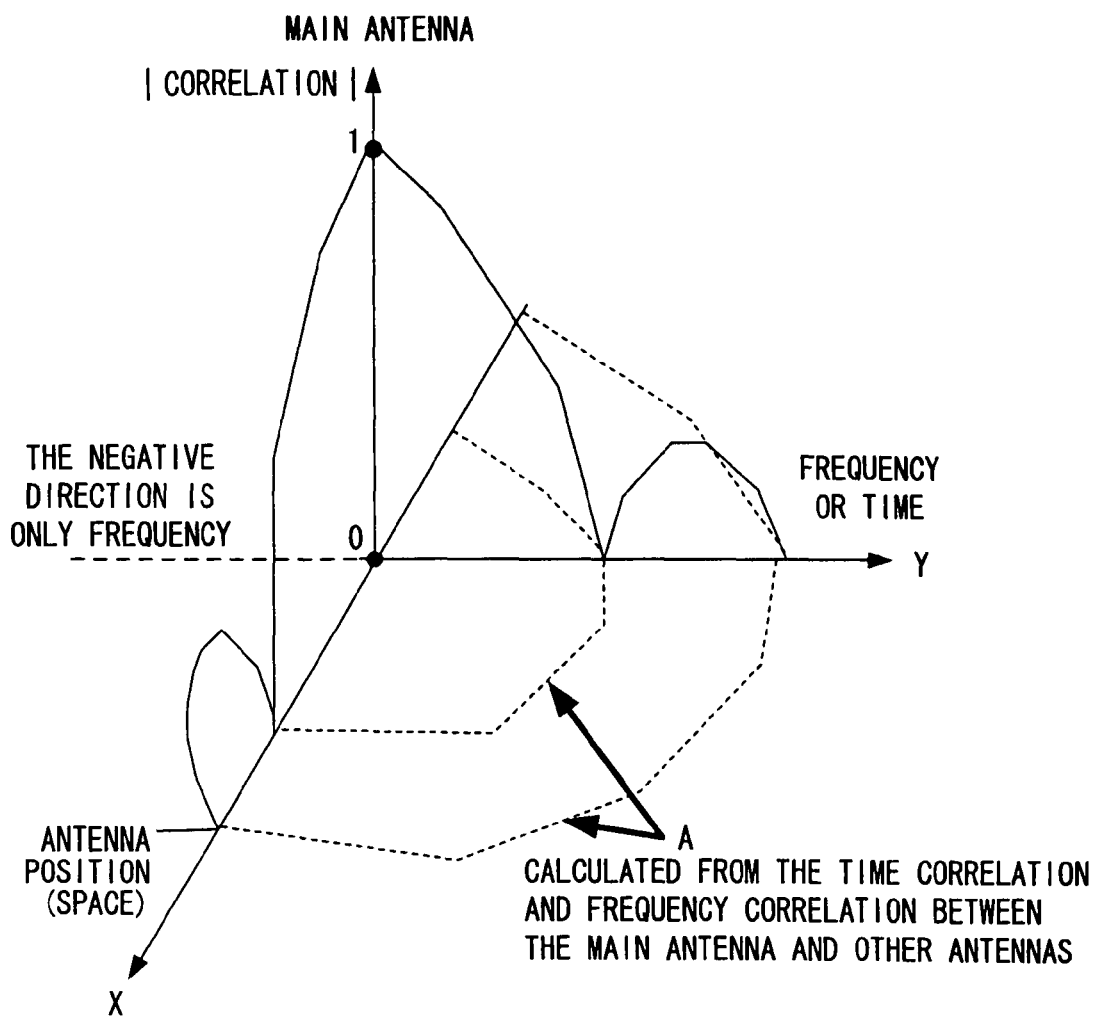
FIG. 10 is a drawing explaining the method for calculating multidimensional correlation.

FIG. 10 is a drawing explaining the method for calculating multi-dimension correlation, and is a two-dimensional correlation map where the correlation coefficient is taken to be in the height direction (evaluation axis), and the antenna position is along one axis in the horizontal plane, and the frequency or time is along the orthogonal axis of the same plane. For example, as shown in FIG. 9, when there is only one frequency band, the antenna position is shown along the X axis, and time is shown along the orthogonal Y axis of the same plane. Under these conditions, an antenna/time region for which the correlation coefficient with the main antenna is nearly '0' is found (the method of calculation will be explained in more detail later).

Decrease in the Amount of Feedback Information in RT Communication

When attempting to transmit the estimated propagation path value or the multi-dimension correlation calculated from it and the SINR of the transmitted pilot as described above in a feedback signal in multi-antenna transmission, there is a very large amount of information, and communication throughput of the link performing the feedback becomes poor. Therefore, a scheduling method for diversity transmission for which the feedback signal has been decreased as much as possible is explained in Table 1.

TABLE 1

| Main Antenna | Antenna 1 |
|---|---|
| Transmission rate | Antenna 1: 6 Mbit(16QAM) |
| Transmission diversity | Yes (RT communication) |
| 2-dimensional correlation map | Antenna 1 |
| (Notify of the resource where the | Antenna 2: Time A, A' |
| correlation with the main antenna is | Antenna 3: Time B |
| '0'.) | Antenna 4: Time C |

First, in RT communication, the combination of the antenna and frequency band having the best propagation environment is obtained and that antenna is called the main antenna, and then the specification of the main antenna must be fed back. In Table 1, an example is given where there is only one frequency band as in FIG. 9, and information indicating that antenna 1 is the main antenna is returned in the feedback signal. Also, from the transmission pilot SINR of the main antenna having the best propagation environment, a maximum transmission rate (6 Mbits) is found for that resource, so that is also fed back. Moreover, in RT communication where retransmission control ARQ is not allowed, it is necessary to send feedback information that specifies transmission diversity. Finally, in order to perform diversity transmission it is only necessary to report the resource which has no correlation with the main antenna so only the resource group where the correlation coefficient on the multi-dimensional correlation map is nearly '0' is fed back. However, RT communication does not allow much time delay, so only an resource having sufficiently short delay is selected. In Table 1, by just sending a notification of the delay time A, A' for antenna 2, the delay time B for antenna 3 and the delay time C for antenna 4 with respect to the transmission timing of the main antenna, it is possible to greatly reduce the amount of feedback.

It is possible for the transmitting station that receives the feedback information to perform transmission diversity as shown in FIG. 9 by selecting one or more resources from among the transmission diversity branches that have no correlation with the main antenna. As the number of resources selected increases, the diversity gain increases and the instantaneous deterioration rate drops. However, when transmission is performed using a plurality of diversity branch resources, the resources of other users may be used. Therefore, unless specially requested, it is preferred that only one diversity branch is selected. Also, since the diversity branches are selected from a plurality of resources so that there is no overlap with the main antenna specification (antenna/time/frequency) of another user, it is possible to avoid a decrease in MUD gain of the scheduler of another user.

Expansion to Diversity Transmission of MIMO Multiplexing

MIMO multiplexing focuses on data and is defined as multiple stream transmission and multiple stream reception, and is different from MIMO communication, which is defined by the state of the channel propagation path.

Figure 11:
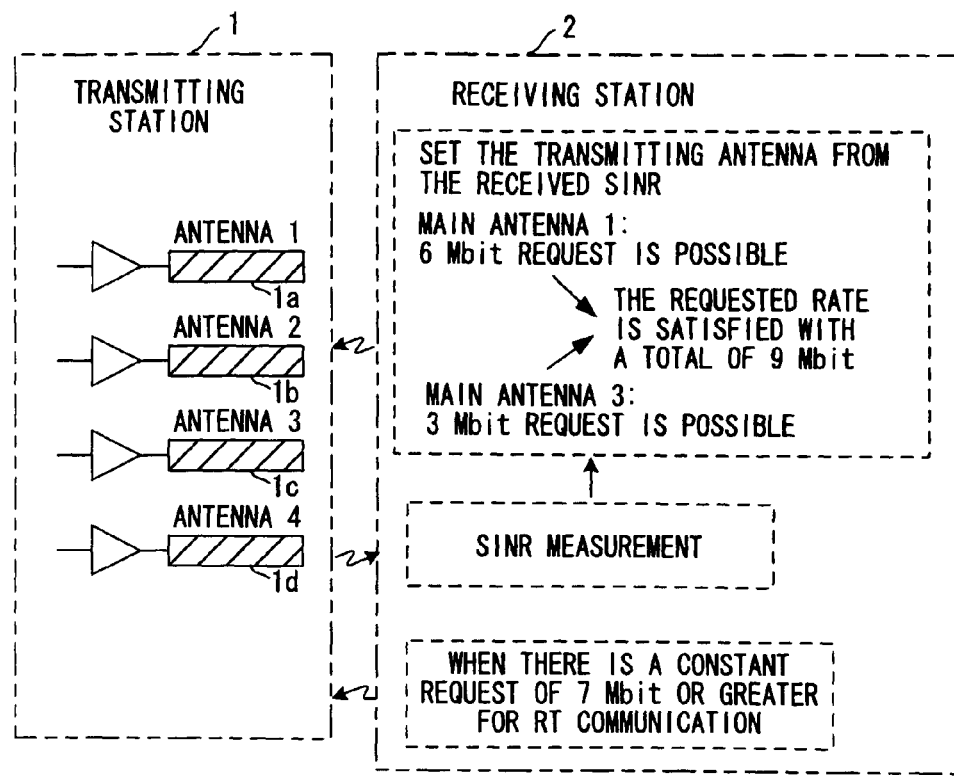
FIG. 11 is a drawing explaining diversity transmission during RT communication using MIMO multiplexing.

Finally, expansion to diversity transmission of MIMO multiplexing will be explained. For example, when a main antenna is specified as shown in FIG. 7 and RT communication at 7 Mbits per every 0.2 sec is requested, it is not possible to satisfy this request. As a possible method for solving this problem, is diversity transmission in MIMO multiplexing as shown in FIG. 11. Diversity transmission in MIMO multiplexing is executed when a high RT communication rate is desired.

Figure 12:
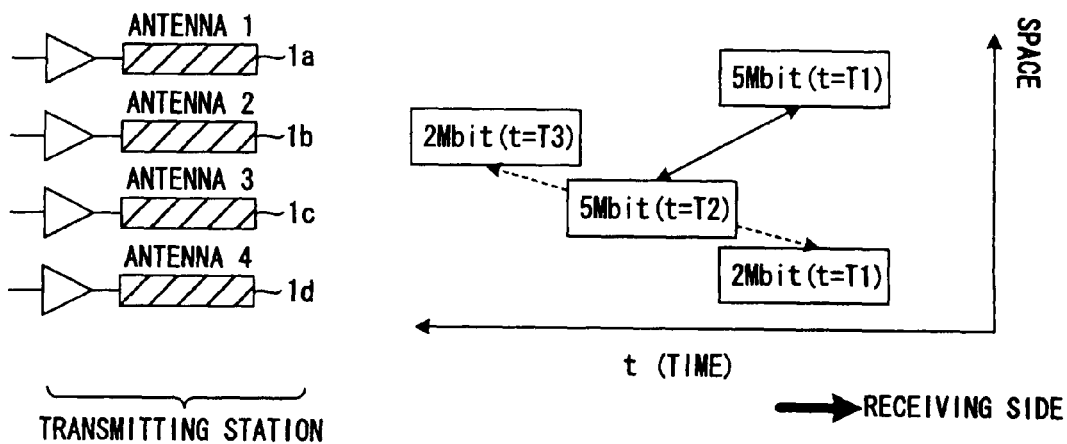
FIG. 12 shows an example of performing MIMO multiplexing diversity.

The receiving station determines the combination of the antenna and frequency band having the highest transmission pilot SINR as the main antenna 1, and the combination of the antenna and frequency band having the next highest SINR as the main antenna 2, and determines similarly main antennas 3 to n up to the maximum MIMO multiplexing number. Here, in the case where the maximum transmission rate from the SINR value of the main antenna 1 satisfies the desired quality of 7 Mbits, transmission is performed from only antenna 1. However, when it does not satisfy the desired quality, MIMO multiplexing transmission is performed using main antennas 1, 2, and the MIMO multiplexing number is gradually increased until the maximum transmission rate satisfies the desired quality of 7 Mbits. In the example shown in FIG. 11, the desired quality is satisfied at certain timing by the main antenna1 1 and 2, so communication is performed at a MIMO multiplexing number of two. FIG. 12 shows another example of performing MIMO multiplexing diversity. With a MIMO multiplexing number of two, a maximum of 9 Mbit transmission is possible, so transmission is performed by lowering transmission to the desired rate of 7 Mbits, and selecting a combination of antennas so that the transmission power becomes a minimum. The transmission power is minimized in order to reduce interference with other users.

In diversity transmission of MIMO multiplexing, the feedback information increases as shown in Table 2.

TABLE 2

Table 2 Selected Feedback Information (MIMO Multiplexing)

| | |
|---|---|
| Main antenna | Antenna 1 Frequency f3 |
| | Antenna 3 Frequency f1 |
| Transmission rate | Antenna 1: 6 Mbit(16QAM) |
| | Antenna 3: 3 Mbit(QPSK) |
| Transmission diversity | Yes |
| 2-dimensional correlation map | Antenna 1 |
| (Notification of the resource where | (Antenna 2 Time A: f2, A': f3, |
| the correlation with the main antenna | Antenna 3 Time B: f1, |
| becomes '0') | Antenna 4 Time C: f3) |
| | Antenna 3 |
| | (Antenna 1 Time a: f1 |
| | Antenna 2 Time b: f3, |
| | Antenna 3 Time c: f2, |
| | Antenna 4 Time d: f2) |

As the maximum MIMO multiplexing number n increases, the amount of feedback increases nearly proportionally, so an appropriate value n is used that takes into account the desired quality.

(B) Methods for Estimating the Propagation Path, Calculating SINR and Calculating the Multi-Dimension Correlation (a) Estimating the Propagation Path The pilot receiving signal when the transmitting antenna is v and the receiving antenna is u can be expressed by Equation (1) for frequency $f_j$ and time t. However, the deterioration when code orthogonality is lost is included in the term $n_u(f_j, t)$.

$$r_{uv}(f_j,t) = h_{uv}(f_j,t) p_v(f_j,t) + n_u(f_j,t) \tag{1}$$

When the amplitude of the pilot is set beforehand to 1, the following relationship is obtained.

$$|p_v(f_j,t)|^2 = p_v(f_j,t) p^*_v(f_j,t) = 1 \tag{2}$$

Here, if S/R is high enough, the estimated propagation path value can be found from Equation (3) below.

$$\hat{h}_{uv}(f_j, t) = p^*_v(f_j, t)\{h_{uv}(f_j, t)p_v(f_j, t) + n_u(f_j, t)\} \tag{3}$$
$$= h_{uv}(f_j, t) + n'_u(f_j, t)$$
$$\cong h_{uv}(f_j, t)$$

Here $$n'_u(f_j,t) = p^*_v(f_j,t) n_u(f_j,t), \text{ and}$$

$$|n_u(f_j,t)| = |n'_u(f_j,t)| \tag{4}$$

Also, when the calculation of Equation (3) is performed $n'_u(f_j, t)$ cannot be ignored by reason of small S/N, an averaging process is performed for time and frequency resources having high correlation. For example, by giving equal weighting before and after the time resource α and before and after the frequency resource β and taking the average, the calculation becomes as in Equation (5) below, and propagation path estimation having suppressed noise and high accuracy can be performed.

$$\bar{\hat{h}}_{uv}(f_j, t) = \frac{1}{(2\beta+1)(2\alpha+1)} \sum_{\Delta f = -\beta}^{\beta} \sum_{\Delta t = -\alpha}^{\alpha} \hat{h}_{uv}(f_{j+\Delta f}, t+\Delta t) \tag{5}$$

(b) SINR Calculation

By using Equation (5) above, propagation path estimation having suppressed noise effect is performed, and the noise component is separated out as in Equation (6) below.

$$\hat{n}_u(f_j,t) = r_{uv}(f_j,t) - \bar{\hat{h}}_{uv}(f_j,t) p_v(f_j,t) \tag{6}$$

Here, the instant SINR for each sub carrier at each reception antenna is rearranged in the order of power and becomes as given in Equation (7) below.

$$SINR_{uv}(f_j, t) = \frac{|\bar{\hat{h}}_{uv}(f_j, t)|^2}{|\hat{n}_u(f_j, t)|^2} \tag{7}$$

Figure 13:
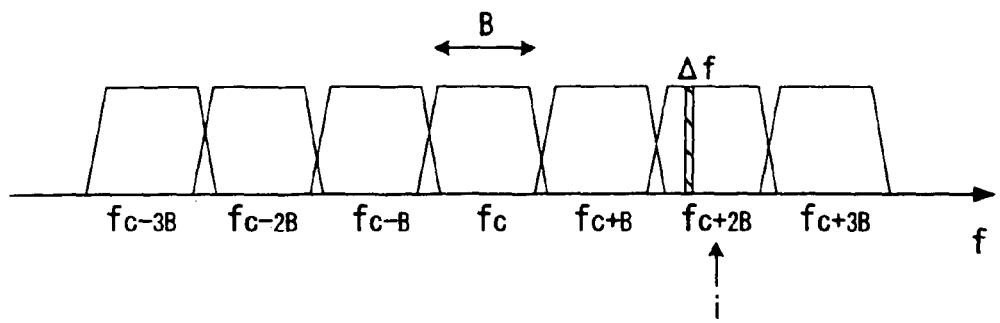
FIG. 13 is a drawing explaining the case of averaging SINR for each frequency band.

However, when the noise is like white noise, this value has large fluctuation. Therefore, for all practical purposes, the SINR that is averaged for each frequency band as shown in FIG. 13 is calculated using Equation (8) and used for AMC or the like.

$$SINR_{uv}(\bar{f}_j, t) = \frac{\int_0^B |\bar{\hat{h}}_{uv}(f_{c+jB+\Delta f}, t)|^2 d\Delta f}{\int_0^B |\hat{n}_u(f_{c+jB+\Delta f}, t)|^2 d\Delta f} \tag{8}$$

$\bar{f}_j$: Average frequency band  B: Frequency bandwidth

Also, in the case where there are a plurality of receiving antennas, it is possible to improve the quality by performing MRC combination (Equation (9)) or combination (Equation (11)) according to the MMSE standard of Equation (10) among the antennas. Moreover, similarly the SINR that are averaged over the period of the control interval in AMC or cell selection can be calculated using Equation (12) or (12)'. The averaged period T is selected in slot units in the case of AMC, and selected in frame units in the case of cell selection. There is U number of antennas.

$$MRC\ SINR_u(\bar{f}_j, t) = \frac{\sum_{u=1}^{U} \int_0^B |\bar{\hat{h}}_{uv}(f_{c+jB+\Delta f}, t)|^4 d\Delta f}{\sum_{u=1}^{U} \int_0^B |\bar{\hat{h}}^*_{uv}(f_{c+jB+\Delta f}, t) n_u(f_{c+jB+\Delta f}, t)|^2 d\Delta f} \tag{9}$$

MMSE Standard:

$$\arg\min_{w_v(f_{c+jB+\Delta f},t)} E\left[|w_v^H(f_{c+jB+\Delta f}, t) r_v(f_{c+jB+\Delta f}, t) - p_v(f_{c+jB+\Delta f}, t)|^2\right] \tag{10}$$

$$MMSE\ SINR_v(\bar{f}_j, t) = \tag{11}$$

$$\frac{\sum_{u=1}^{U} \int_0^B |w^*_{uv}(f_{c+jB+\Delta f}, t) \bar{\hat{h}}_{uv}(f_{c+jB+\Delta f}, t)|^2 d\Delta f}{\sum_{u=1}^{U} \int_0^B |w^*_{uv}(f_{c+jB+\Delta f}, t) n_u(f_{c+jB+\Delta f}, t)|^2 d\Delta f}$$

-continued $$MRC\ SINR_v(\overline{f}_j, \overline{t}) = \frac{\sum_{u=1}^{U} \int_{t-T/2}^{t+T/2} \int_0^B |\overline{\hat{h}}_{uv}(f_{c+jB+\Delta f}, t)|^4 d\Delta f dt}{\sum_{u=1}^{U} \int_{t-T/2}^{t+T/2} \int_0^B |\overline{\hat{h}}_{uv}^*(f_{c+jB+\Delta f}, t)n_u(f_{c+jB+\Delta f}, t)|^2 d\Delta f dt} \quad (12)$$

T: Averaged time (slot, frame)

$$MMSE\ SINR_v(\overline{f}_j, \overline{t}) = \frac{\sum_{u=1}^{U} \int_{t-T/2}^{t+T/2} \int_0^B |w_{uv}^*(f_{c+jB+\Delta f}, t)\overline{h}_{uv}(f_{c+jB+\Delta f}, t)|^2 df_j dt}{\sum_{u=1}^{U} \int_{t-T/2}^{t+T/2} \int_0^B |w_{uv}^*(f_{c+jB+\Delta f}, t)n_u(f_{c+jB+\Delta f}, t)|^2 df_j dt} \quad (12)'$$

(c) Method for Calculating Multi-Dimension Correlation

Time correlation, frequency correlation, spatial correlation and multi-correlation, which is a combination of these, will be explained. Also, since communication for each frequency band is presumed, the case in which that is reflected will be explained.

Using the estimated propagation path value $\hat{h}_{uv}(f_j,t)$ expressed by Equation (5), time correlation can be written as show below.

$$\rho_a(u, \tau) = \frac{\int_{-T/2}^{T/2} \overline{\hat{h}}_{uv}(f_j, t)\overline{\hat{h}}_{uv}^*(f_j, t-\tau)dt}{\sqrt{\int_{-T/2}^{T/2} |\overline{\hat{h}}_{uv}(f_j, t)|^2 dt} \sqrt{\int_{-T/2}^{T/2} |\overline{\hat{h}}_{uv}(f_j, t-\tau)|^2 dt}} \quad (13)$$

The $\tau$ in $\rho(u, \tau)$ means that the timing for just $\tau$ is different with respect to the reference pilot, and $\Delta f$, v' that appears later also means that the frequency and transmitting antenna are different.

When reception is performed using U number of receiving antennas, amplitude weighting is performed and it is possible to give weighting to and take the average of the correlation values of each of the antennas. However, since the correlation values are expressed as complex values, the absolute value is computed at the timing of the combination and converted to a scalar amount.

$$|\rho_a(\tau)| = \frac{1}{\sum_{u=1}^{U} |\overline{\hat{h}}_{uv}(f_j, t)||\overline{\hat{h}}_{uv}(f_j, t-\tau)|} \sum_{u=1}^{U} |\overline{\hat{h}}_{uv}(f_j, t)||\overline{\hat{h}}_{uv}(f_j, t-\tau)||\rho(u, \tau)| \quad (14)$$

Similarly, the frequency correlation when reception is performed using U number of antennas is expressed by Equations (15) and (16).

$$\rho_a(u, \Delta f) = \frac{\int_{-T/2}^{T/2} \overline{\hat{h}}_{uv}(f_j, t)\overline{\hat{h}}_{uv}^*(f_{j+\Delta f}, t)dt}{\sqrt{\int_{-T/2}^{T/2} |\overline{\hat{h}}_{uv}(f_j, t)|^2 dt} \sqrt{\int_{-T/2}^{T/2} |\overline{\hat{h}}_{uv}(f_{j+\Delta f}, t)|^2 dt}} \quad (15)$$

$$|\rho_a(\Delta f)| = \frac{1}{\sum_{u=1}^{U} |\overline{\hat{h}}_{uv}(f_j, t)||\overline{\hat{h}}_{uv}(f_{j+\Delta f}, t)|} \sum_{u=1}^{U} |\overline{\hat{h}}_{uv}(f_j, t)||\overline{\hat{h}}_{uv}(f_{j+\Delta f}, t)||\rho(u, \Delta f)| \quad (16)$$

Similarly, the spatial correlation on the transmitting side when performing reception using U number of antennas is expressed by Equations (17) and (18).

$$\rho_a(u, v') = \frac{\int_{-T/2}^{T/2} \overline{\hat{h}}_{uv}(f_j, t)\overline{\hat{h}}_{uv'}^*(f_j, t)dt}{\sqrt{\int_{-T/2}^{T/2} |\overline{\hat{h}}_{uv}(f_j, t)|^2 dt} \sqrt{\int_{-T/2}^{T/2} |\overline{\hat{h}}_{uv'}(f_j, t)|^2 dt}} \quad (17)$$

$$|\rho_a(v')| = \frac{1}{\sum_{u=1}^{U} |\overline{\hat{h}}_{uv}(f_j, t)||\overline{\hat{h}}_{uv'}(f_j, t)|} \sum_{u=1}^{U} |\overline{\hat{h}}_{uv}(f_j, t)||\overline{\hat{h}}_{uv'}(f_j, t)||\rho(u, v')| \quad (18)$$

By combining these elements, the multi-dimension correlation can be expressed as shown below.

$$\rho_a(u, v', \tau, \Delta f) = \frac{\int_{-T/2}^{T/2} \overline{\hat{h}}_{uv}(f_j, t)\overline{\hat{h}}_{uv'}^*(f_{j+\Delta f}, t-\tau)dt}{\sqrt{\int_{-T/2}^{T/2} |\overline{\hat{h}}_{uv}(f_j, t)|^2 dt} \sqrt{\int_{-T/2}^{T/2} |\overline{\hat{h}}_{uv'}(f_{j+\Delta f}, t-\tau)|^2 dt}} \quad (19)$$

$$|\rho_a(v', \tau, \Delta f)| = \frac{1}{\sum_{u=1}^{U} |\overline{\hat{h}}_{uv}(f_j, t)||\overline{\hat{h}}_{uv'}(f_{j+\Delta f}, t-\tau)|} \sum_{u=1}^{U} |\overline{\hat{h}}_{uv}(f_j, t)||\overline{\hat{h}}_{uv'}(f_{j+\Delta f}, t-\tau)||\rho(u, v', \tau, \Delta f)| \quad (20)$$

u: Receiving antenna

Figure 14:
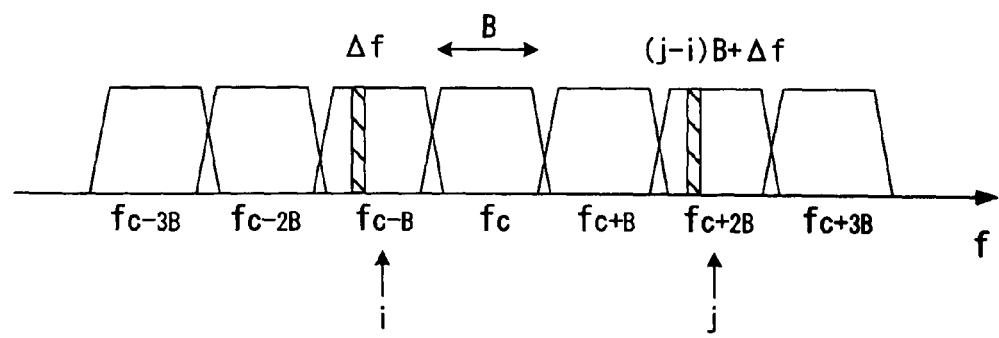
FIG. 14 is a drawing explaining the case of averaging the frequency correlation value.

U: Number of receiving antennas v, v': Transmitting antenna $\tau$: Delay time $\Delta f$: Frequency offset T: Average interval for which correlation calculation is performed The above is the result of frequency correlation between two frequency bands. When finding the correlation between frequency bands i and j (see FIG. 14), the frequency correlation is computed at the end of the frequency bands i and j, and then the frequency correlation is calculated for each $\Delta f$ within the entire frequency bands i and j, and the frequency correlation value is found by taking the average of these. Equations (21) and (22) are obtained by transforming Equation (19) and (20). As shown in FIG. 14, i is the frequency band of the reference pilot, and j is the frequency band of a correlated pilot, and B is the frequency band.

$$\rho_a(u, v', \tau, i, j, \Delta f) = \frac{\int_{-T/2}^{T/2} \overline{\hat{h}}_{uv}(f_{c+iB+\Delta f}, t)\overline{\hat{h}}^*_{uv'}(f_{c+jB+\Delta f}, t-\tau)dt}{\sqrt{\int_{-T/2}^{T/2}\left|\overline{\hat{h}}_{uv}(f_{c+iB+\Delta f}, t)\right|^2 dt}} \quad (21)$$

$$\sqrt{\int_{-T/2}^{T/2}\left|\overline{\hat{h}}_{uv'}(f_{c+jB+\Delta f}, t-\tau)\right|^2 dt}$$

$$|\rho_a(v', \tau, i, j, \Delta f)| = \frac{1}{\sum_{u=1}^{U}\left|\overline{\hat{h}}_{uv}(f_{c+iB+\Delta f}, t)\right|\left|\overline{\hat{h}}_{uv'}(f_{c+jB+\Delta f}, t-\tau)\right|} \times \quad (22)$$

$$\sum_{u=1}^{U}\left|\overline{\hat{h}}_{uv}(f_{c+iB+\Delta f}, t)\right|\left|\overline{\hat{h}}_{uv'}(f_{c+jB+\Delta f}, t-\tau)\right||\rho(u, v', \tau, i, j, \Delta f)|$$

When the correction values within the frequency band are averaged, Equation (23) is obtained.

$$|\rho_a(v', \tau, i, j, \overline{f})| = \frac{1}{B}\int_0^B |\rho_a(v, \tau, i, j, \Delta f)|d\Delta f \quad (23)$$

$\overline{f}$: Frequency band average

The purpose for calculating the multi-dimension correlation is to find a non correlated resource that has a correlation value of '0' or near '0' as an resource where large diversity gain can be obtained. A worst threshold value is given by the correlation coefficient expressed by Equation (24) which is equal to or less than 0.6.

$$p_p(v',\tau,i,j,\overline{f})=|\rho_a(v',\tau,i,j,\overline{f})|^2 \quad (24)$$

Next, the configuration for MISO (Mutliple Input Single Output) transmission and reception will be explained, and then it will be shown that MIMO configuration is also possible.

(C) First Embodiment

Slot Format

Figure 15:
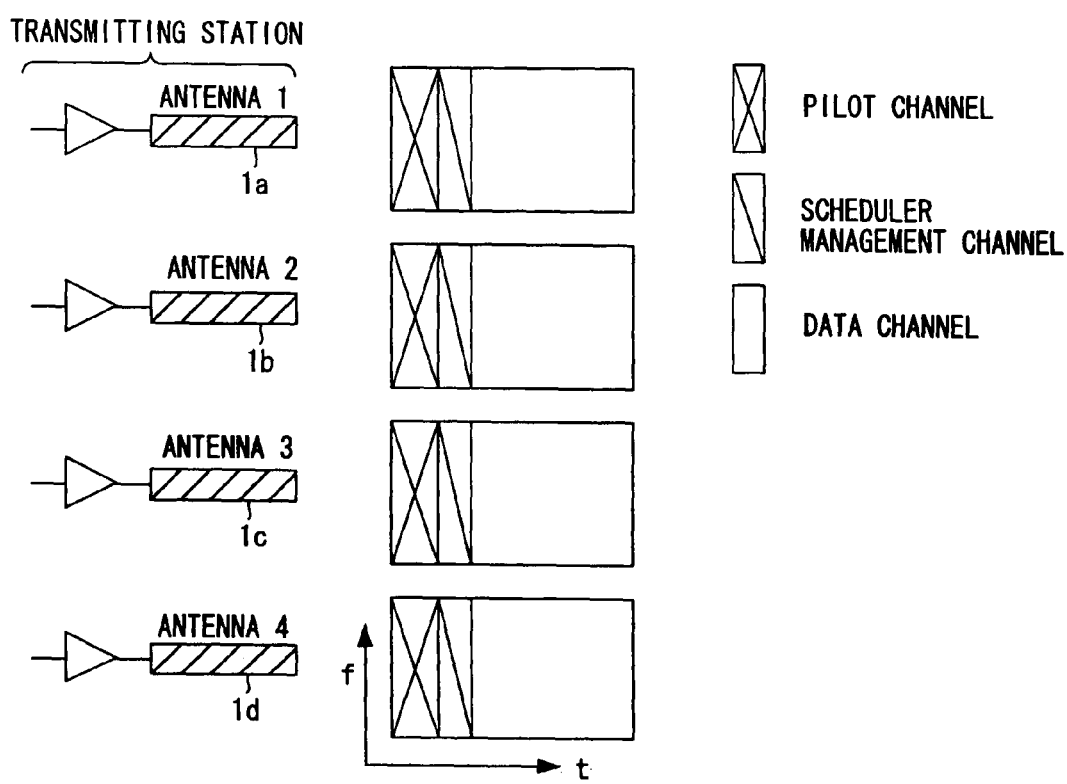
FIG. 15 is a drawing explaining the transmission slot format of the present invention.

FIG. 15 is a drawing explaining the transmission slot format of the present invention, where a pilot channel, control channel (scheduler management channel) and data channel are time division multiplexed. The present invention can be applied in the case of slot format in which the transmission pilots are orthogonal, however, below the case having the slot format shown in FIG. 15 will be explained.

A common scheduler management channel is a channel for notification of the transmitting antenna, slot, frequency band, modulation and encoding method, receiving station ID (terminal ID), and antenna type (main antenna, diversity branch). The pilot channel and scheduler management channel are transmitted by a predetermined modulation and encoding method for each antenna and frequency band and decoded on the receiving side. The transmitting antennas also include antennas having different polarization.

Construction of a Transmitting Station

Figure 16:
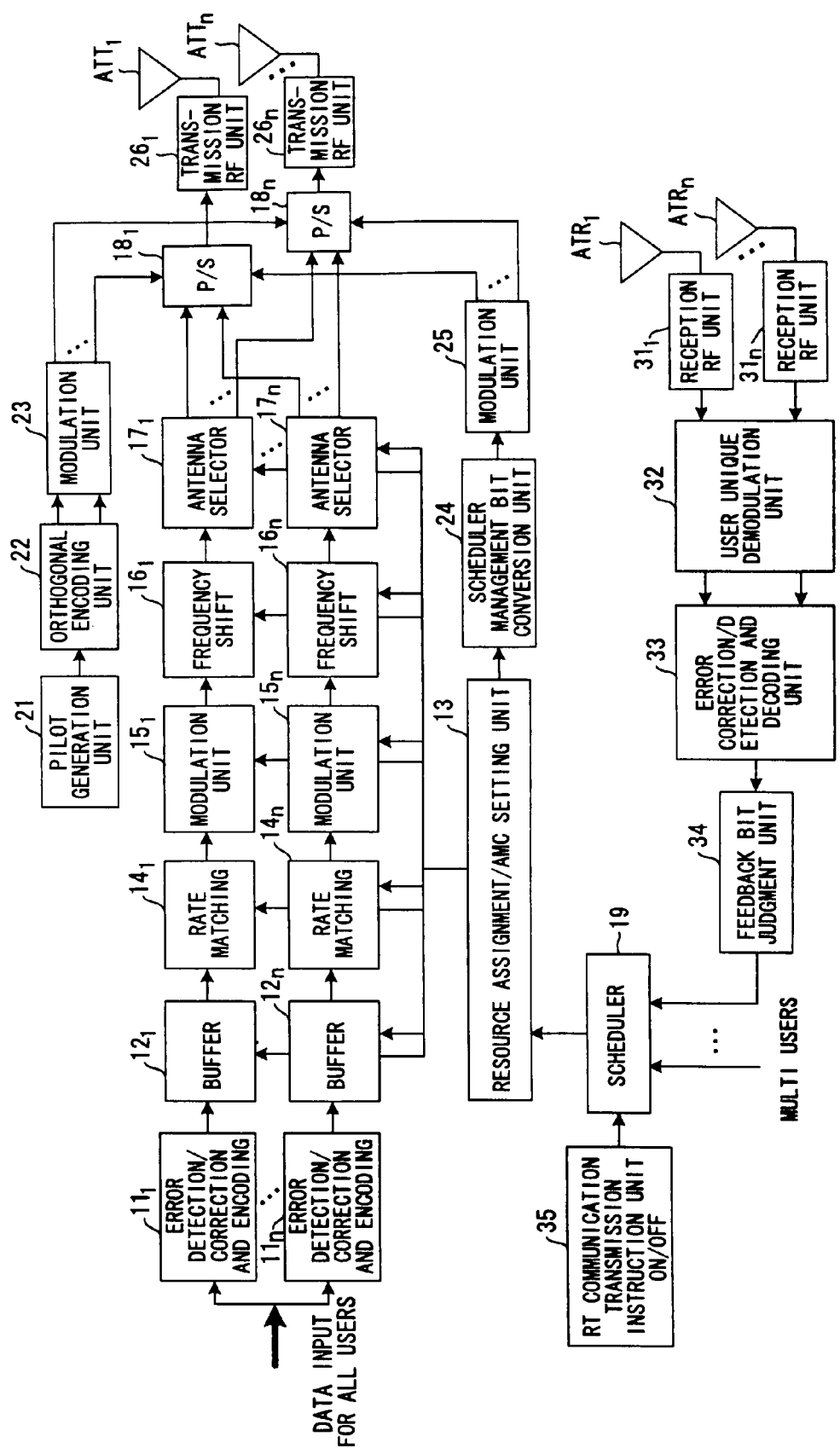
FIG. 16 is a drawing showing the construction of a transmitting station of the invention.

FIG. 16 is a drawing that shows the construction of a transmitting station of the present invention, where there is a plurality of transmitting antennas ATT1 to ATTn and a plurality of receiving antennas ATR to ATRn, and these antennas can be used in common. Error detection code is attached to the data of all users by specified error detection/correction and encoding units $11_1$ to $11_n$ of transmission units, and then that data is encoded by the units $11_1$ to $11_n$ using a specified encoding method such as turbo encoding and then saved in buffers $12_1$ to $12_n$. After that, user data that is specified by an resource assignment/AMC setting unit 13 is read from the buffers $12_1$ to $12_n$, and input to rate matching units $14_1$ to $14_n$. The rate matching unit $14_1$ to $14_n$ perform rate matching according to an encoding rate that is specified by the resource assignment/AMC setting unit 13, modulation units $15_1$ to $15_n$ perform modulation according to a multi-value modulation method that is specified by the resource assignment/AMC setting unit 13, frequency shift units $16_1$ to $16_n$ shift the frequency of the input data in the frequency band that is specified by the resource assignment/AMC setting unit 13, and antenna selectors $17_1$ to $17_n$ select one or more transmitting antennas to which the user data is to be input according to an instruction from the resource assignment/AMC setting unit 13 and inputs the data to the P/S conversion units $18_1$ to $18_n$ in the next stage. The resource assignment/AMC setting unit 13 controls each of the units based on user data assignment, encoding rate, modulation method, frequency and diversity antennas that are determined by the results of the scheduling process by the scheduler 19.

A pilot generation unit 21 generates pilots that are to be output from each antenna, an orthogonal encoding unit 22 multiplies the pilots by orthogonal codes so that the pilots are orthogonal with each other, and a modulation unit 23 modulates the pilots with a predetermined modulation method unique to the pilots, and inputs the result to P/S conversion units $18_1$ to $18_n$.

The resource assignment/AMC setting unit 13 inputs scheduler management data (transmitting antenna, slot, frequency band, modulation and encoding method, receiving station ID, antenna type, etc.) to a scheduler management bit conversion unit 24 so that the receiving station can properly demodulate and decode the signals transmitted from the transmitting station. The scheduler management bit conversion unit 24 maps the scheduler management data on a scheduler management channel, and a modulation unit 25 modulates the scheduler management data using a predetermined modulation method unique to scheduler management data, and inputs the result to the P/S conversion units $18_1$ to $18_n$.

The P/S conversion units $18_1$ to $18_n$ select input data according to the slot format shown in FIG. 15 in the order of the pilot channel, scheduler management channel and data channel, and input the data to transmission RF units $26_1$ to $26_n$. The transmission RF units $26_1$ to $26_n$ perform frequency UP conversion of the frequency of the input baseband signals to RF signals, then amplify the signals and transmit them from transmitting antennas $ATT_1$ to $ATT_n$ to the receiving station.

On the other hand, signals that are transmitted from the receiving station are received by receiving antennas $ATR_1$ to $ATR_n$, and input to reception RF units $31_1$ to $31_n$. The reception RF units $31_1$ to $31_n$ convert the radio signals to baseband signals, and input the results to a user-unique demodulation unit 32. The user-unique demodulation unit 32 demodulates the signals from specified receiving stations (users), and an error correction/detection and decoding unit 33 decodes the received data from the demodulated signals, performs error detection and correction and outputs the result. A feedback bit judgment unit 34 extracts the feedback data (SINR, CQI, data shown in Table 1, etc.) from the decoded data that is fed back from the receiving station and inputs it to a scheduler 19. Data that is fed back from other users is also similarly demodulated, decoded and input to the scheduler 19.

After receiving an RT communication request from a network or terminal (receiving station) a RT communication transmission instruction unit 35 notifies the scheduler 19 that there was a RT communication request (RT communication ON). When RT communication is OFF, the scheduler 19 performs a conventional scheduling process based on the SINR or CQI that is included in the feedback data, and when RT communication is ON, performs the scheduling according to the flowchart that will be described later, then determines the diversity branches and the transmission method and notifies the resource assignment/AMC setting unit 13 of the processing results.

It is also possible to insert a Guard Interval (GI) before the transmission RF units $26_1$ to $26_n$ in order to suppress interference between symbols. Also, it is possible to place the error detection encoding unit after the scheduler management bit conversion unit 24. Furthermore, it is possible to specify the method (CC, IR) of sending diversity branches in AMC (adaptive modulating and coding). Moreover, FIG. 16 is for a single carrier (SC), however, transmission by a multi carrier (MC) is also possible.

Construction of a Receiving Station

Figure 17:
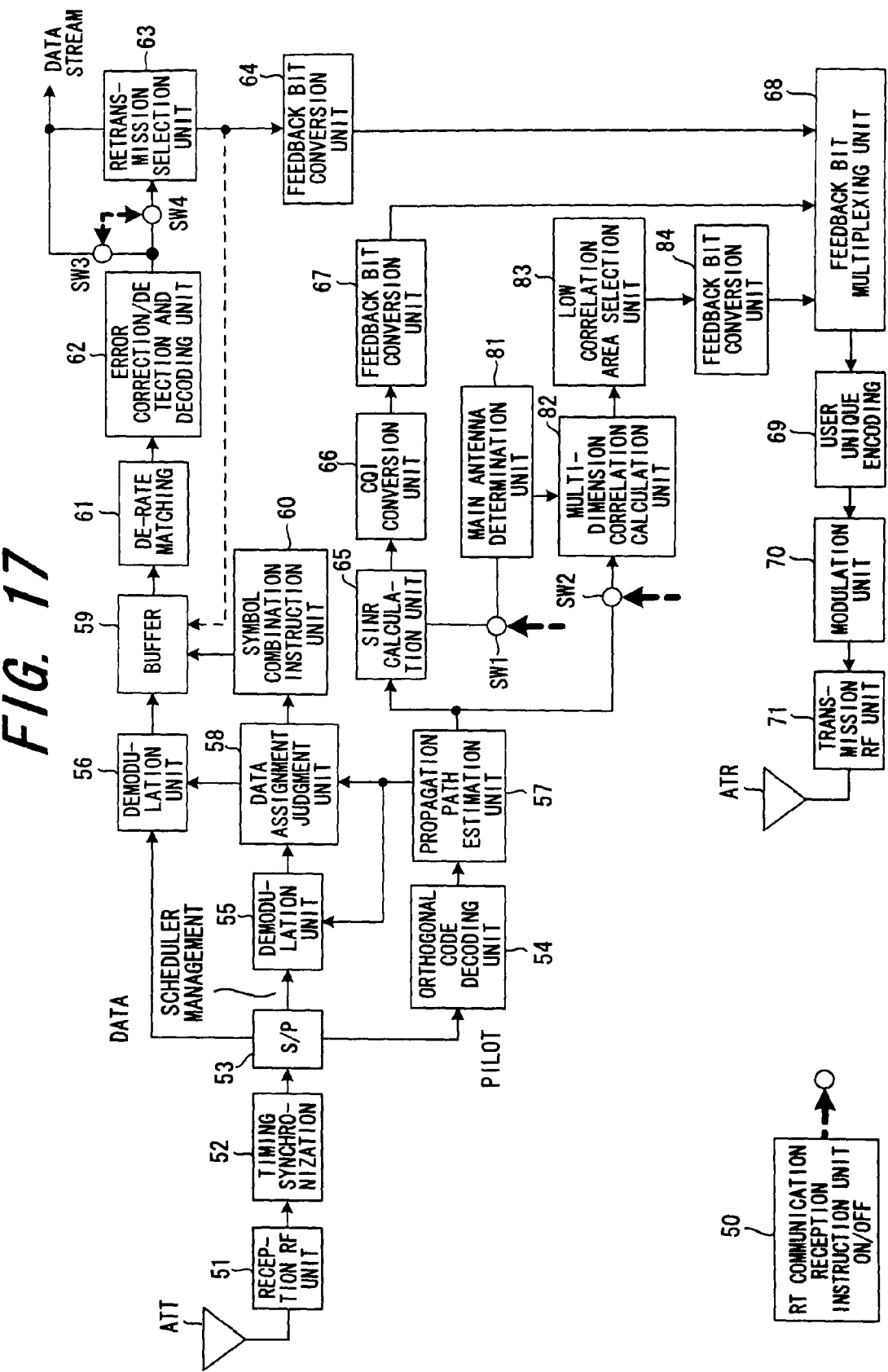
FIG. 17 is a drawing showing the construction of a receiving station of the invention.

FIG. 17 is a drawing showing the construction of a receiving station of the present invention. A RT communication reception instruction unit 50 receives a RT communication ON or RT communication OFF instruction from the control unit of a host (not shown), and in the case of RT communication ON, turns ON switches SW1 to SW3, and turns OFF SW4, and in the case of RT communication OFF, turns OFF switches SW1 to SW3, and turns ON switch SW4.

A reception RF unit 51 performs frequency DOWN conversion on a radio signal from a transmitting station that is received by the antenna ATT and inputs the resulting baseband signal to a timing synchronization unit 52. The timing synchronization unit 52 comprises a path detection unit or AFC circuit, executes slot synchronization and inputs bit-serially the channel signals that constitutes slots to an S/P conversion unit 53. The S/P conversion unit 53 separates the channels into a pilot channel, scheduler management channel and data channel, and inputs the channels to an orthogonal code decoding unit 54, scheduler management channel demodulation unit 55 and data channel demodulation unit 56, respectively. The orthogonal code demodulation unit 54 demodulates the pilot from the pilot channel, and a propagation path estimation unit 57 estimates the propagation path (channel) from the pilot signal and outputs an estimated propagation path value. The scheduler management channel demodulation unit 55 uses the estimated propagation path value and demodulates the scheduler management channel, then inputs the scheduler management information to a data assignment judgment unit 58.

The data assignment judgment unit 58 make reference to the demodulated scheduler management information, and if the data is for itself, inputs the estimated propagation path value to the data channel demodulation unit 56. When the estimated propagation path value is input, the data channel demodulation unit 56 demodulates the data channel, and inputs the demodulated data to the buffer 59. In other words, based upon the information from the data assignment judgment unit 58, the demodulation unit 56 is able to determine whether or not in the current slot there is data assigned to its own terminal. Therefore, in order to reduce the scale of operation, it is able to demodulate data only at the timing and frequency band for which its own data is assigned.

A symbol combination instruction unit 60 determines whether the received data was received from the main antenna or was received from a diversity branch based upon the scheduler management information, and notifies a buffer 59 of the symbol combination method according to CC type combination or IR type combination that is included in the scheduler management information that was received from the main antenna. The buffer 59 combines the stored symbols and new symbols that are the result of demodulation by the demodulation unit 56 for the number of diversity antennas (bit combination), and outputs the combined result.

A de-rate matching unit 61 performs de-rate matching and inputs the result to an error correction/detection and decoding unit 62. The error correction/detection and decoding unit 62 decodes the data (for example turbo decoding), and performs error detection correction processing, and when RT communication is ON, outputs the received data for which error detection correction processing has been performed as is as a data stream by way of switch SW3. When RT communication is OFF, a retransmission selection unit 63 outputs the data as a data stream when there is no error, and inputs ACK to a feedback bit conversion unit 64, however, when there is error, does not output the data as a data stream, and inputs NACK to the feedback bit conversion unit 64.

A SINR calculation unit 65 uses the estimated propagation path value to calculate the SINR, and a CQI conversion unit 66 finds the CQI (Channel Quality Indicator) according to the SINR and inputs it to a feedback bit conversion unit 67. CQI is a parameter that is also used for transmitting the reception quality to the radio base station. In other words, CQI is information for the receiving station to notify the transmitting station of the reception environment; for example, a table conversion value that corresponds to the maximum transport block size for which the block error rate BLER does not exceed 0.1 in that reception environment is reported to the base station as a value CQI=1 to 30.

When RT communication is OFF, a feedback multiplexing unit 68 multiplexes the bit data that is output from the feedback bit conversion units 64, 67, and a user-unique encoding unit 69 encodes the feedback information in code that is unique to the user, then a modulation unit 70 performs modulation such as spreading modulation or orthogonal modulation, after which a transmission RF unit 71 converts the signal to an RF signal and transmits the signal from the transmitting antenna ATR. The user unique encoding is for identifying the user, and encoding is performed using a frequency band, time, encoding method or the like that corresponds to the user. The dashed line from the retransmission selection unit 63 indicates that when RT communication is OFF and retransmission is not necessary, it sends an ACK signal as feedback to the buffer to release stored data, and when retransmission is necessary sends a NACK signal as feedback to the buffer to hold the data.

When RT communication is ON, switches SW1 and SW2 are closed, so a main antenna determination unit 81 determines plural antennas having good quality from among the SINR of the pilots from each of the transmitting antennas as main antennas. The number of main antennas is selected so that it corresponds to the MIMO multiplexing number that is set in accordance to the specifications or RT communication rate of the receiving station (mobile terminal) when communication is started. For example, in a MISO communication system, the computation processing capability on the receiving side is comparatively low, so one multiplex is selected and the number of main antennas is 2. A multi-dimension correlation calculation unit 82 calculates multi-dimension correlation of a combination of spatial correlation, time correlation and frequency correlation by regarding the resource of the antenna, timing and frequency band of the main antenna as a basis, and a low correlation resource selection unit 83 finds resources (antenna, timing, frequency band) where there is no correlation with the main antenna, or in other words resources where the correlation with the main antenna is zero or less than a threshold value and inputs the result to a feedback bit conversion unit 84. When RT communication is ON, the feedback bit multiplexing unit 68 multiplexes the bit data input from the feedback bit conversion unit 67 and the bit data input from the feedback bit conversion unit 84, and feeds the result back to the transmitting station by way of the user unique encoding unit 69, the modulation unit 70, transmission RF unit 71 and transmitting antenna ATR. This feedback information includes information that is shown in Table 1 for example. It is possible to send CQI as a converted value of the maximum transmission rate and to convert from the CQI to the maximum transmission rate at the transmitting station. In other words, from the received CQI, the scheduler 19 of the transmitting station determines whether or not the radio environment in the DOWN direction is good, and when it is good, switches to a modulation method that is capable of transmitting data at a higher speed, however, when it is not good, switches to a modulation method that transmits data at a lower speed (in other words, performs adaptive modulation). More specifically, the base station has a CQI table that defines formats having different transmission speeds that correspond to the value CQI=1 to 30, and finds from that CQI table a transmission speed, modulation method, number of multiplexing code and the like that correspond to the CQI as candidate values for the resource assignment/AMC setting unit 13.

It is possible to make error correction encoding to each feedback bit after feedback bit is multiplexed.

RT Communication ON Notification from the Network

Figure 18:
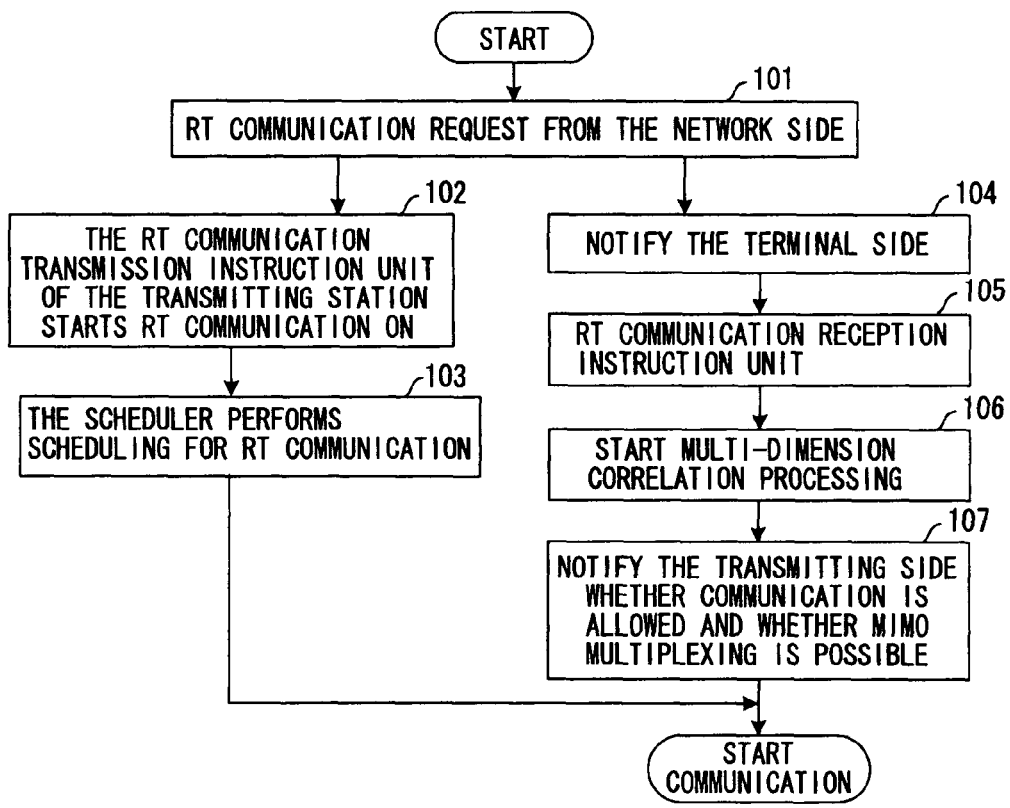
FIG. 18 is a flowchart showing the process when a RT communication ON is notified from the network.

FIG. 18 is a flowchart of the process of RT communication ON notification from the network. When the network generates a request that it is necessary to perform RT communication (step S101), the RT communication transmission instruction unit 35 of the base station inputs a RT ON and a RT communication rate request to the scheduler 19 (step 102), and the scheduler 19 starts scheduling control based on RT communication ON (step 103). Also, the base station notifies the mobile terminal of RT communication ON and the RT communication rate request (step 104), and the RT communication reception instruction unit 50 of the mobile terminal outputs RT communication ON according to that notification and turns ON switches SW1 to SW3, and turns OFF switch SW4. By doing this, the main antenna determination unit 81 and multi-dimension correlation calculation unit 82 are activated and start the multi-dimension correlation calculation process (step 106), and send a notification to the base station that communication is allowed and whether MIMO multiplexing is possible (step 107). In this first embodiment, for example, notification is sent that MIMO multiplexing is not possible. From the above, RT communication becomes possible between the mobile terminal and base station.

RT Communication ON Notification from a Mobile Terminal

Figure 19:
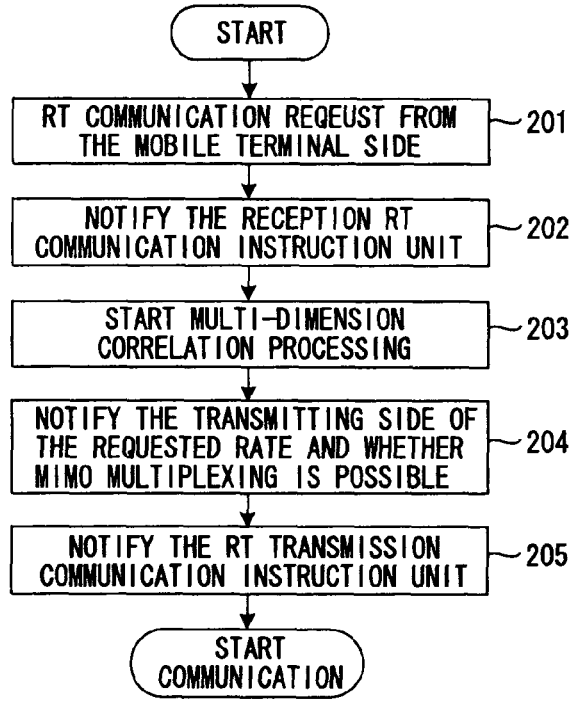
FIG. 19 is a flowchart showing the process when a RT communication ON is notified from a mobile terminal.

FIG. 18 shows the case in which a RT communication request is sent from the network, however it is also possible to send a request from a mobile terminal. FIG. 19 is a flowchart showing the process of sending a RT communication ON notification from a mobile terminal.

In the case of an online game, when a RT communication request is issued from a mobile terminal (step 201), the RT communication reception instruction unit 50 outputs RT communication ON according to that notification, then turns ON switches SW1 to SW3, and turns OFF switch SW4 (step 202). By doing this, the main antenna determination unit 81 and multi-dimension correlation calculation unit 82 are activated and start the multi-dimension correlation calculation process (step 203), and send a notification to the base station that communication is allowed and whether MIMO multiplexing is possible (step 204). In this first embodiment, for example, notification is sent that MIMO multiplexing is not possible. Also, the mobile terminal sends a RT communication request to the base station, and by doing this, the RT communication transmission instruction unit 35 of the base station inputs RT communication ON to the scheduler 19, and the scheduler 19 starts scheduling control based on the RT communication ON instruction (step 205). From the above, RT communication becomes possible between the mobile terminal and the base station.

Operation of a Base Station and Mobile Terminal During RT Communication

Figure 20:
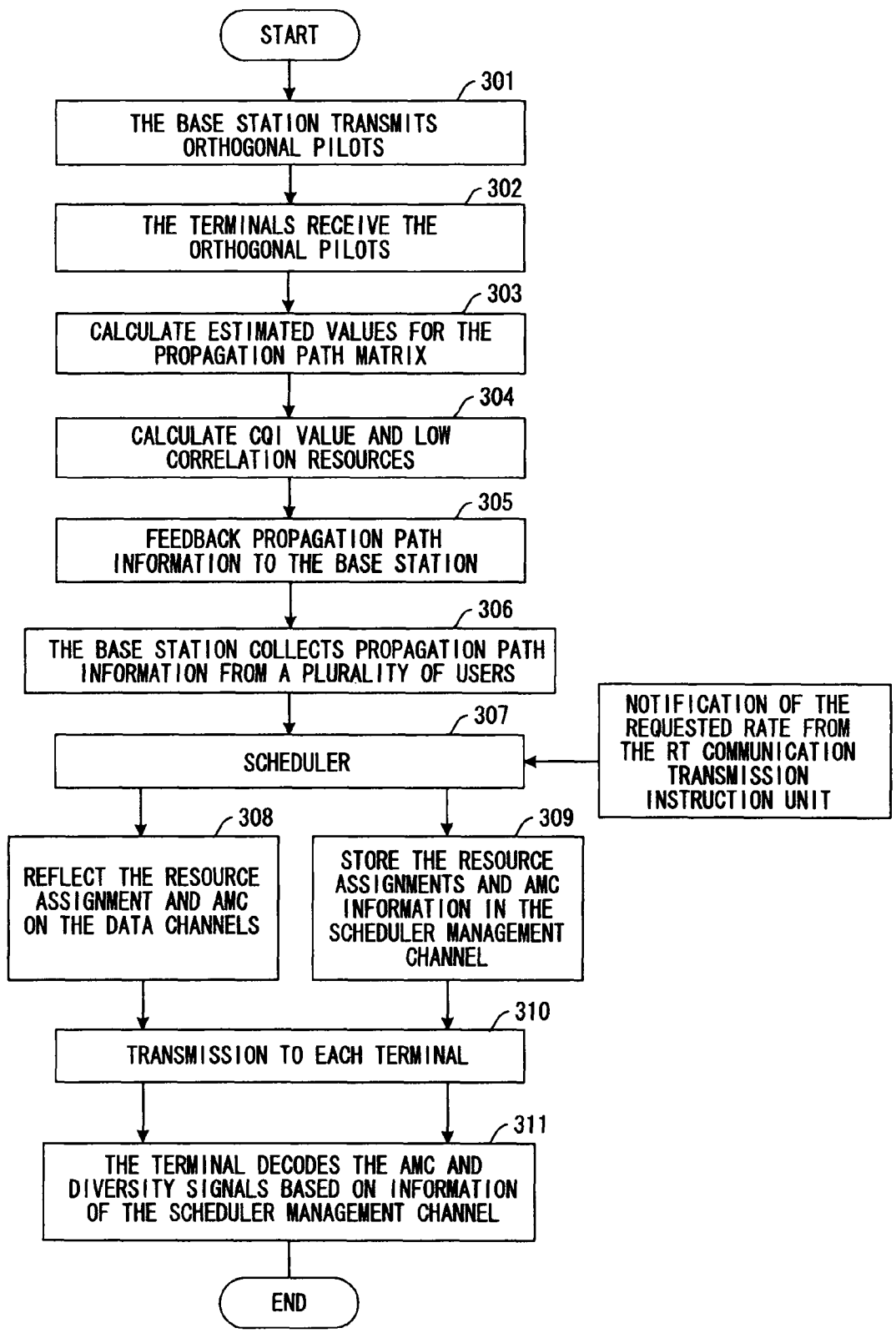
FIG. 20 is a flowchart showing the operation of the base station and mobile terminal during RT communication.

FIG. 20 is a flowchart of the operation of a base station and mobile terminal during RT communication.

The base station transmits an orthogonal pilot to the mobile terminal (step 301), and the mobile terminal receives that orthogonal pilot signal (step 302), then based on that pilot calculates an estimated propagation path value (step 303), uses the estimation propagation path value to calculate a CQI value and low correlation resources (step 304), and feeds back this information to the base station (step 305). The scheduler 19 of the base station collects feedback information from each mobile terminal (step 306), and performs scheduling based on the collected information (CQI value, resource information) and the RT communication rate that is input from the RT communication transmission instruction unit 35, then determines the transmission method, or in other words, determines which user data to transmit, which antenna to use and at what transmission rate to transmit the data, and notifies the resource assignment/AMC setting unit 13 of them (step 307).

The resource assignment/AMC setting unit 13 creates a data channel in order to transmit the user data at the specified rate as instructed from the scheduler 19 (step 308). Also, the resource assignment/AMC setting unit 13 creates a scheduler management channel that specifies the transmission method (resource assignment, AMC information, etc.) so that the transmitted data can be demodulated by the mobile terminal (step 309), then multiplexes the data channel and scheduler management channel with a pilot channel and transmits the data (step 310). The mobile terminal performs demodulation processing based on the scheduler management channel, and performs combination processing of symbols received by the main antenna and diversity branches (step 311). After that, the control described above is continuously performed until RT communication is complete.

Diversity Branch Determination Process

Figure 21:
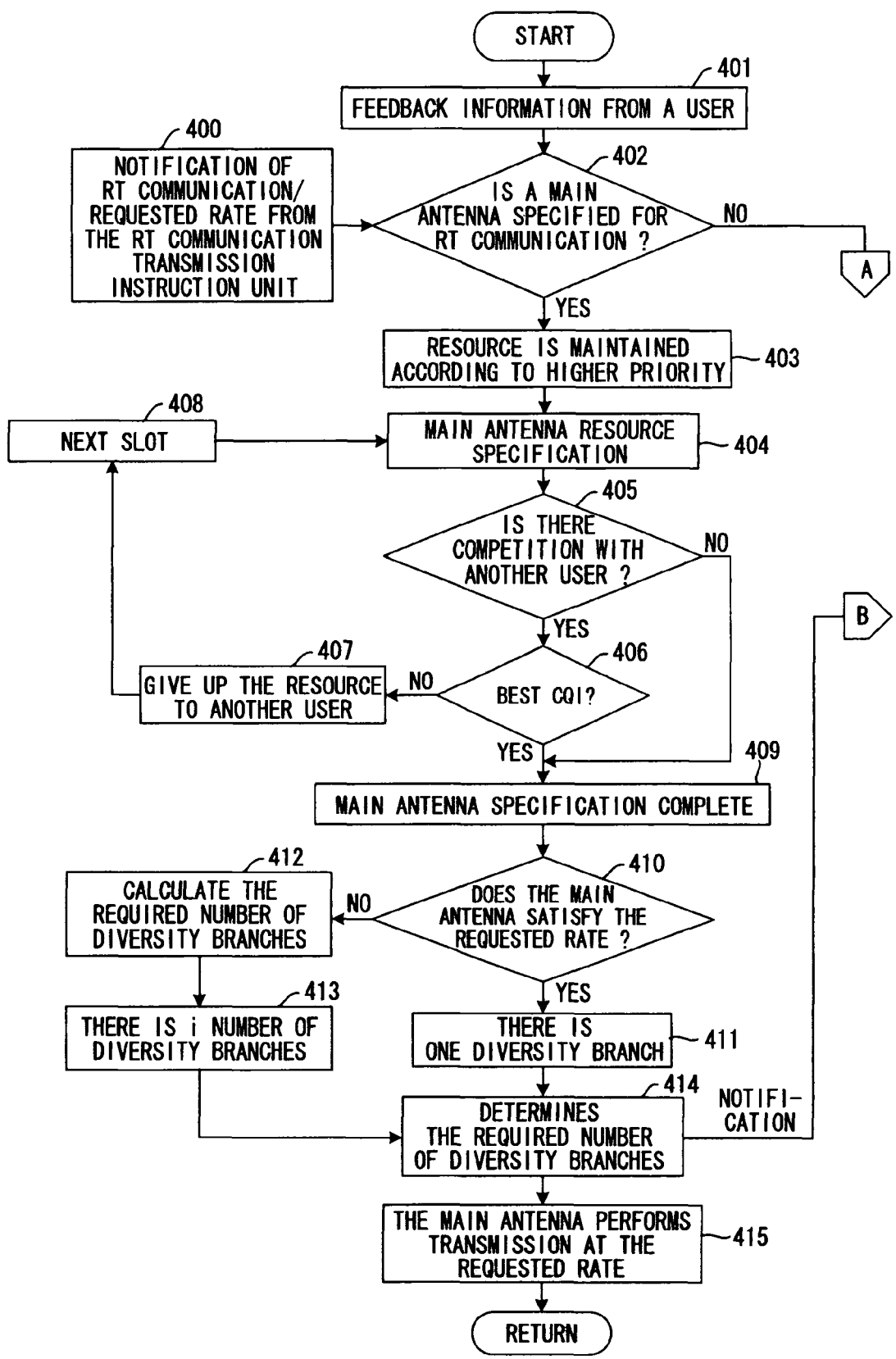
FIG. 21 is a flowchart showing the process of determining the diversity antenna (diversity branch) of the scheduler during RT communication.
Figure 22:
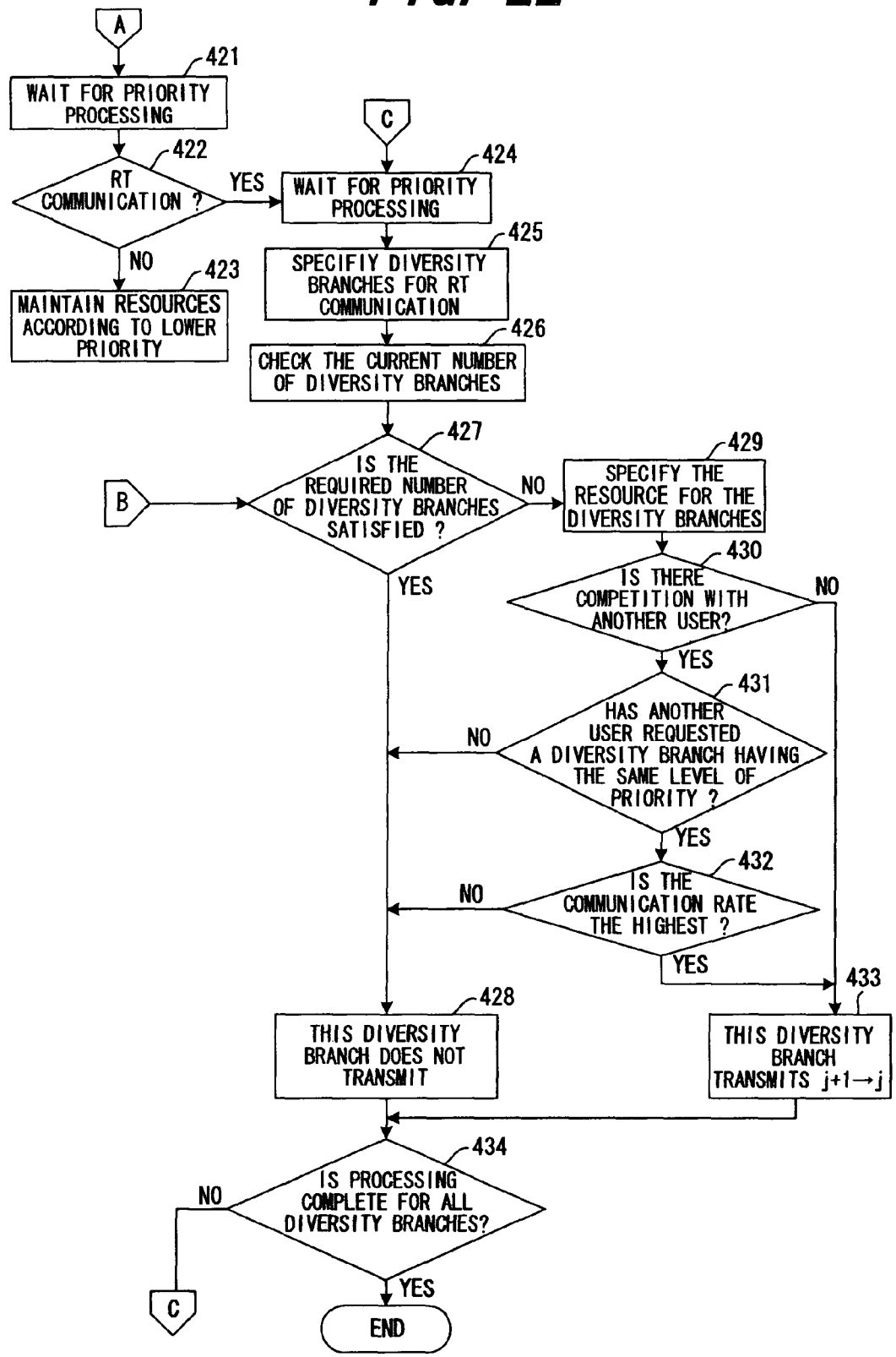
FIG. 22 is a flowchart showing the process of determining the diversity branch of the scheduler during RT communication.

FIG. 21 and FIG. 22 are flowcharts showing the process performed by the scheduler for determining diversity antennas (diversity branches) during RT communication.

While in the state of receiving RT communication ON and the RT communication rate from the RT communication transmission instruction unit 35 (step 400), the scheduler 19 acquires feedback information from the mobile terminal (step 401). In the case where the main antenna is specified in the feedback information (step 402), the transmission frequency and slot of that main antenna are maintained as the transmission resource of the main antenna (steps 403, 404).

Figure 23:
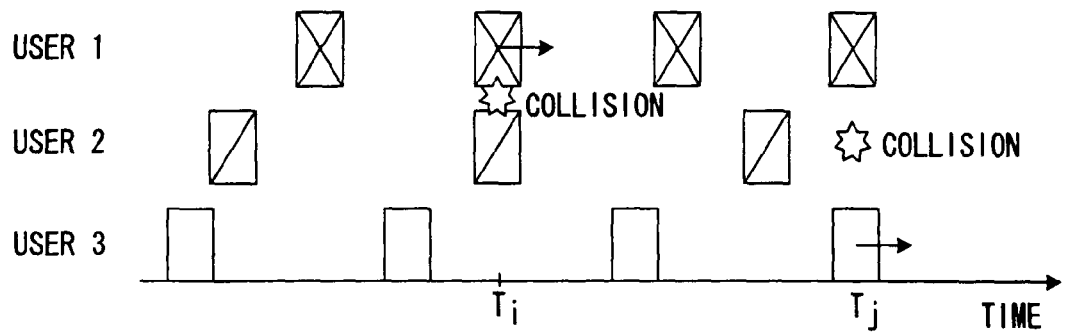
FIG. 23 is a drawing showing the state where the transmission resource of the user collides with another resource.

Next, the scheduler checks whether the transmission resource will compete with the transmission resources of other users (step 405). FIG. 23 is a drawing explaining the state of collision between the transmission resource of a user and the transmission resource of another user, where the transmission resource of user 1 competes with that of user 2 at timing Ti of slot Si, and competes with the transmission resource of user 3 at timing Tj of slot Sj. When competing, transmission from the user whose CQI value that is fed back is the highest has priority, and transmission of other users shifts to the timing of the next slot.

Therefore, in step 405, when there is competition, the scheduler 19 compares the CQI values of each of the users (step 406), and when the CQI of another user is larger, that transmission resource is given to the other user (step 407), and the transmission frequency of the main antenna and the next slot are maintained as a new transmission resource (steps 408, 404), then the processing from step 405 is repeated.

In step 405, when there are no competing users, or in step 406 when the CQI of the mobile terminal of interest is larger, then the transmission resource that is maintained in step 404 or step 408 is set as the transmission resource of the main antenna and processing ends (step 409).

Next, the scheduler 19 checks whether the requested rate for RT communication is satisfied by just the main antenna (step 410), and when the rate is satisfied, one diversity branch is designated (step 411). However, when the requested rate for RT communication cannot be satisfied by just one main antenna, the number of diversity branches is calculated according to the flowchart shown in FIG. 24 (step 412), and 'i' is obtained as the number of diversity branches (step 413). The scheduler 19 determines and saves the number of diversity branches based on step 411 or step 413 (step 414), and determines the main antenna to perform transmission at the requested rate (step 415), then returns to the beginning of the process.

In step 402, when the main antenna is not specified in the feedback information, or when the main antenna is specified and the processing from step 402 to 415 is finished, then after a specified priority process has finished, the scheduler 19 checks whether communication is RT communication (steps 421 to 422), and when RT communication is not in progress, performs the normal scheduling processing (resource is maintained with lower priority) (step 423).

On the other hand, when RT communication is in progress, then after lower priority processing has ended, the scheduler 19 selects the diversity branch specified in the feedback information, and checks the number of diversity branches 'j' assigned up until the present (steps 424 to 426). Next, the scheduler 19 checks whether j=i, or in other words, checks whether the number of requested diversity branches that was determined in step 414 have been assigned (step 427), and when they have been assigned, determines that transmission is not performed from a diversity branch that was selected in step 425 (step 428). When j<i, the transmission frequency and slot that were specified in the feedback information are specified as the transmission resource for the diversity branch (step 429). Next the scheduler 19 checks whether there is competition with the transmission resource of another user (step 430). When there is competition, the scheduler 19 checks whether the other user has requested a diversity branch having the same level of priority (step 431), and when the other user has higher priority such as main antenna specification, or communication other than RT communication, the scheduler 19 determines to not perform transmission from the selected diversity branch (step 428). However, when the other user has requested a diversity branch having the same level of priority, the scheduler 19 compares the CQI of each user (step 432), and when the CQI of the other user is larger, that transmission resource is given to the other user, and the scheduler 19 determines to not perform transmission from the selected diversity branch (step 428). On the other hand, when the CQI of the mobile terminal of interest is larger, or when in step 430 there are no competing users, the scheduler 19 determines to perform transmission from the diversity branch selected in step 425 and increments j (j=j+1) (step 433).

When the processing of step 428 or step 433 is finished, the scheduler 19 checks whether the above processing has finished for all diversity branches (step 434), and when processing has finished (YES), the diversity branch setting process ends, however, when processing is not finished (NO), the scheduler 19 returns to step 424 and repeats the processing from step 424 on.

As can be seen from the explanation above, when a requested RT rate cannot be satisfied by just the main antenna during RT communication, the present invention is a method for compensating for the needed energy with diversity branches.

Figure 24:
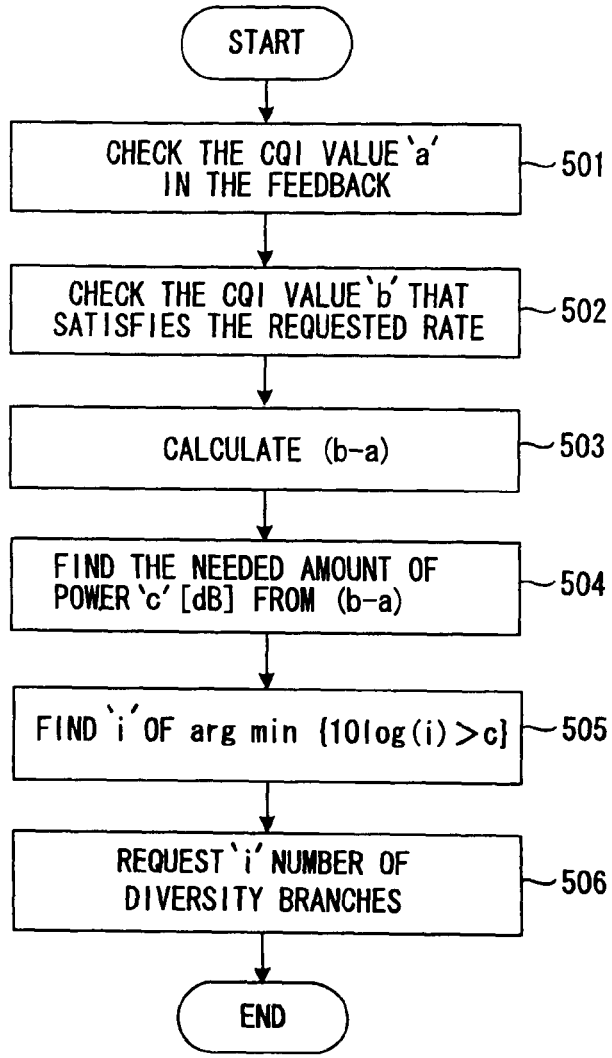
FIG. 24 is a flowchart showing the process of calculating the number of diversity branches.

The method for calculating the number of required diversity branches will be explained with a specific example using the flowchart shown in FIG. 24 and the CQI table (table showing the relationship between the CQI and transmission rate) shown in Table 3.

TABLE 3

Table 3 Relationship Between CQI Value and Transmission Rate

| CQI Value | Transmission Rate | Modulation | Encoding Rate | Requested Rate | Current Status |
|---|---|---|---|---|---|
| 1 | 400 kbit/slot | QPSK | 1/15 | | |
| ... | ... | ... | ... | | |
| 8 | 3 Mbit/slot | QPSK | ½ | | ← |
| ... | ... | ... | ... | | |
| 13 | 5 Mbit/slot | 16QAM | 5/16 | ← | |
| ... | ... | ... | ... | | |

The requested rate is taken to be 5 Mbits, and the CQI value of the main antenna that is fed back from the terminal is taken to be 8 (steps 501, 502). Therefore, from the CQI value, the maximum transmission rate allowed for the propagation path is 3 Mbits, which does not satisfy the requested rate. The CQI value that would satisfy the requested rate is 13, so the difference (13−8) is 5 (step 503). The CQI value is a value that is converted on the receiving side from the transmitted pilot SINR; for example, CQI values are set in advance for every 1 dB. Under these conditions, it can be seen that the requested rate would be satisfied if the propagation path were increased by 5 dB (step 504).

In this invention, in RT communication, in order that 5 Mbit communication is always maintained, the main antenna transmits the requested rate, and the amount of needed energy is compensated for by increasing the number of diversity branches. Here a gain of 5 dB is desired, so the value 'i' that will satisfy $$\arg\min_i \{10 \log_{10}(i) > c\}$$

is found (step 505), and i number of diversity branches are requested (step 506), and the 5 dB of needed energy is transmitted by i number of diversity branches. By performing transmission by the number of diversity branches found in this way, not only is the needed energy compensated for, but it is also possible to perform steady RT communication since dropping due to fading is also compensated for.

In the first embodiment described above, the amount of insufficient energy needed by the main antenna in RT communication in a radio communication system having MISO construction is compensated for by diversity branches, so it is possible to satisfy the RT communication rate, and to decrease the error rate without performing retransmission control. Also, it is possible to perform scheduling so that a drop in MUD of other users is prevented without interfering with the transmission timing of other users.

(C) Second Embodiment

Figure 25:
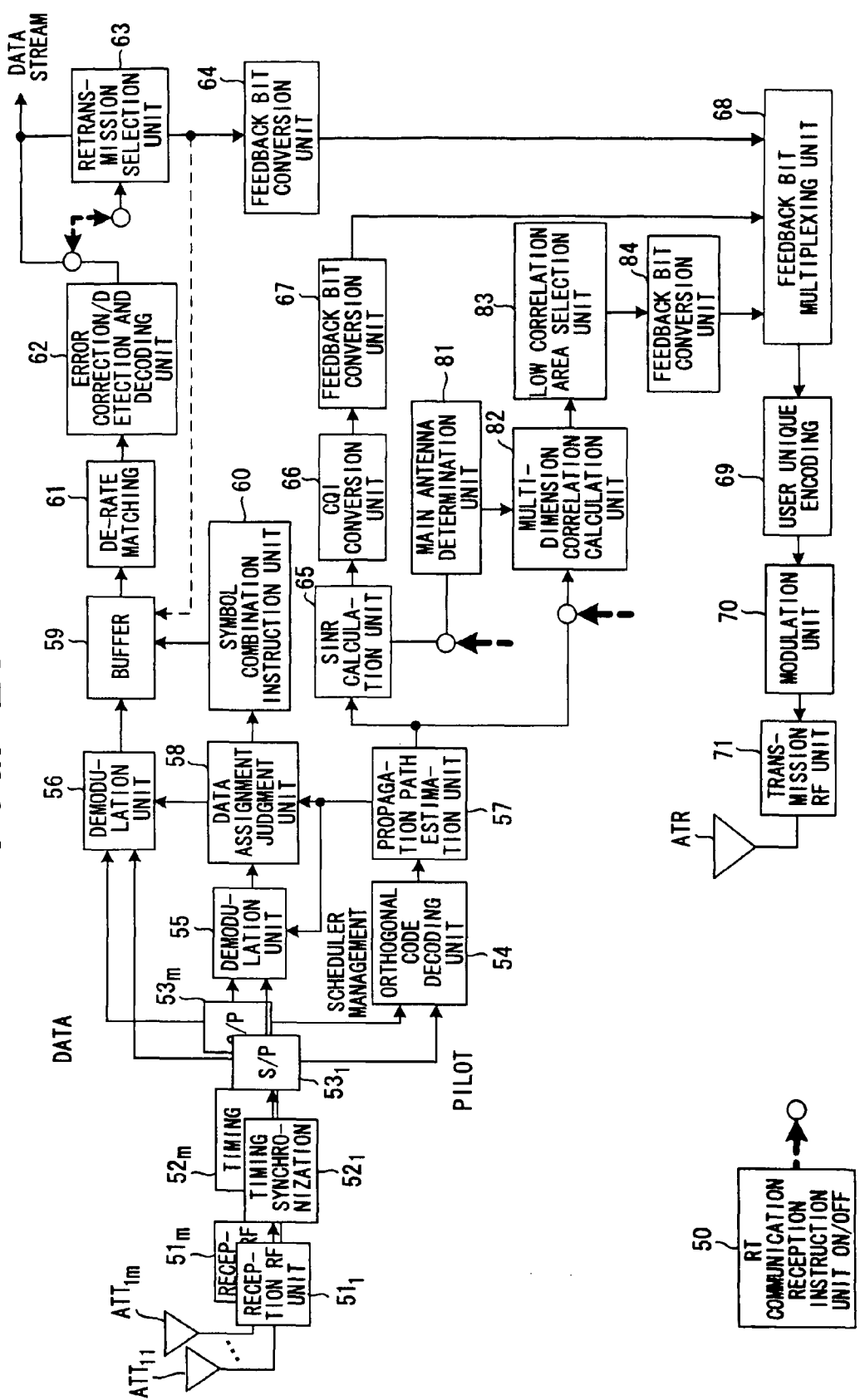
FIG. 25 is a drawing of the construction of a receiving station (mobile terminal) in a MIMO radio communication system.

FIG. 25 is a drawing showing the construction of a receiving station (mobile terminal) in a MIMO radio communication system, where the same reference numbers are used for parts that are the same as those of the first embodiment shown in FIG. 17. The construction differs in that:

(1) there are m number of receiving gropes comprising antennas $ATT_{11}$ to $ATT_{1M}$, reception RF units $51_1$ to $51_m$, timing synchronization units $52_1$ to $52_m$, and S/P conversion units $53_1$ to $53_m$;

(2) the propagation path estimation unit 57 calculates estimated values for all propagation paths from the transmission antennas to the receiving antennas; and (3) plural main antennas that satisfy the requested RT communication during RT communication are specified, multi-dimension correlation between each of the main antennas and other antennas is calculated, and data for resources of low correlation for each main antenna is fed back. In other words, a SINR calculation unit 65 measures the reception quality in the mobile terminal for each signal that is sent from each antenna, a main antenna determination unit 81 determines plural main antennas whose correlation is low each other based on the SINR, a multi-dimension correlation calculation unit 82 calculates the multi-dimension correlation between each of the main antennas and other antennas, a low correlation resource selection unit 83 selects resources where a multi-dimension correlation is lower than a set value for each main antenna, and a feedback bit multiplexing unit 68 feeds back data to the transmitting side that indicates the main antennas, low correlation resources for each main antenna and reception qualities.

Figure 26:
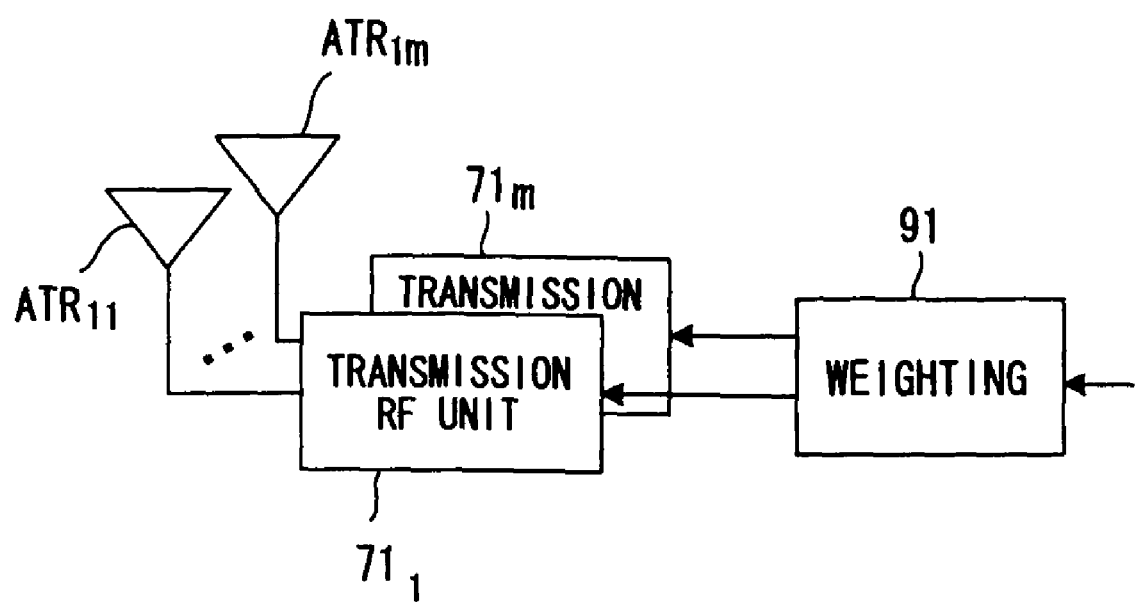
FIG. 26 is a drawing showing construction of the transmitting unit of the receiving station in a MIMO radio communication system.

As shown in FIG. 26, it is possible to use multiple antennas $ATR_{11}$ to $ATR_{1m}$ as transmitting antenna and to place a weight block 91 in front of reception RF units $71_1$ to $71_m$ connected to the multiple antennas $ATR_{11}$ to $ATR_1$. The weight block 91 gives weighting to the feedback signals, and the feedback signals pass through transmission RF units $71_1$ to $71_m$ and are transmitted from the transmitting antennas $ATR_{11}$ to $ATR_{1m}$. In this way, by attaching suitable weighting, beam forming is possible, and it is possible to perform multiplexed transmission similar to MIMO.

Diversity Antenna Setting Process

Figure 27:
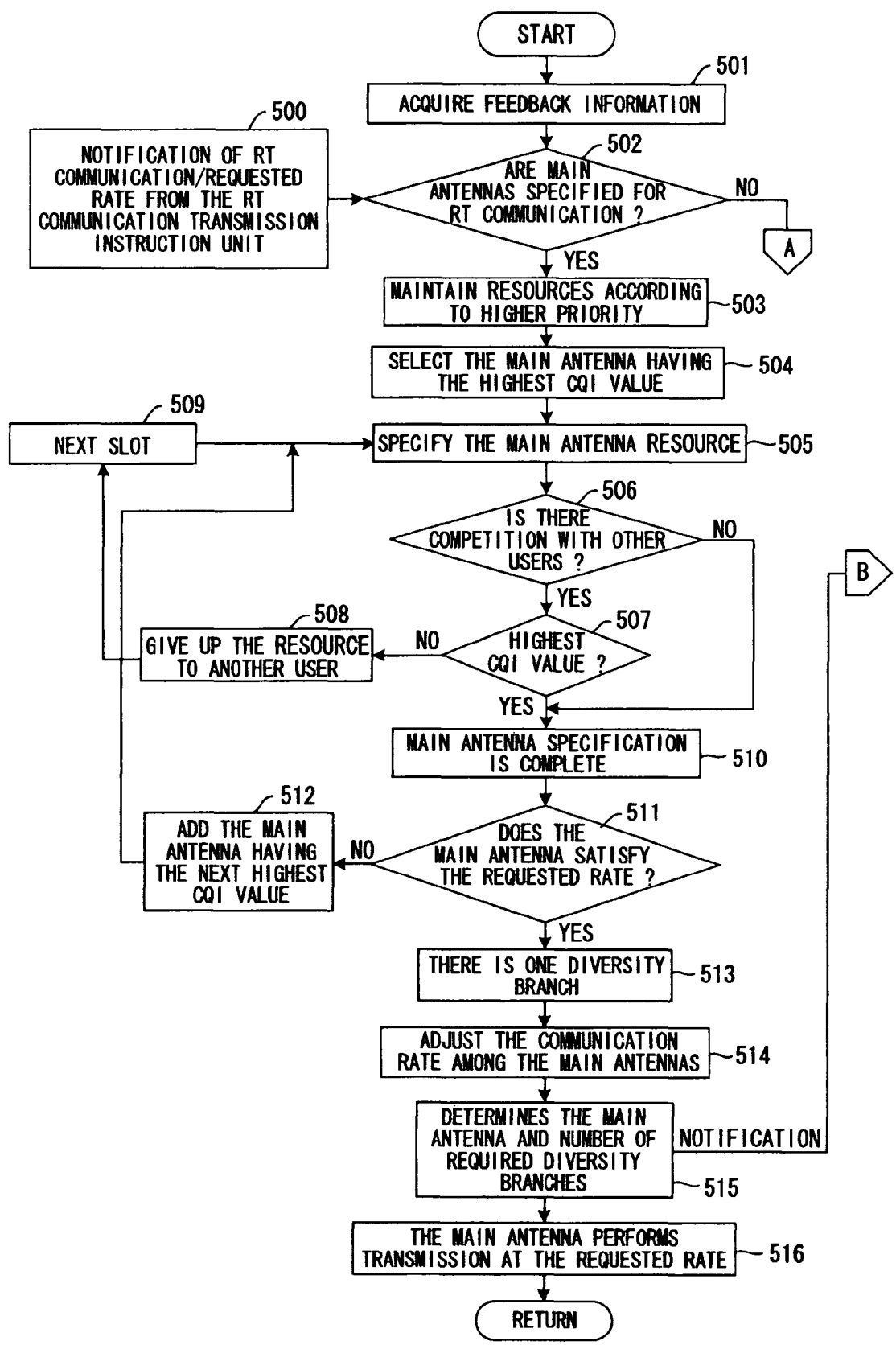
FIG. 27 is a flowchart showing the process performed by the scheduler to determine diversity branches during RT communication in a MIMO radio communication system.
Figure 28:
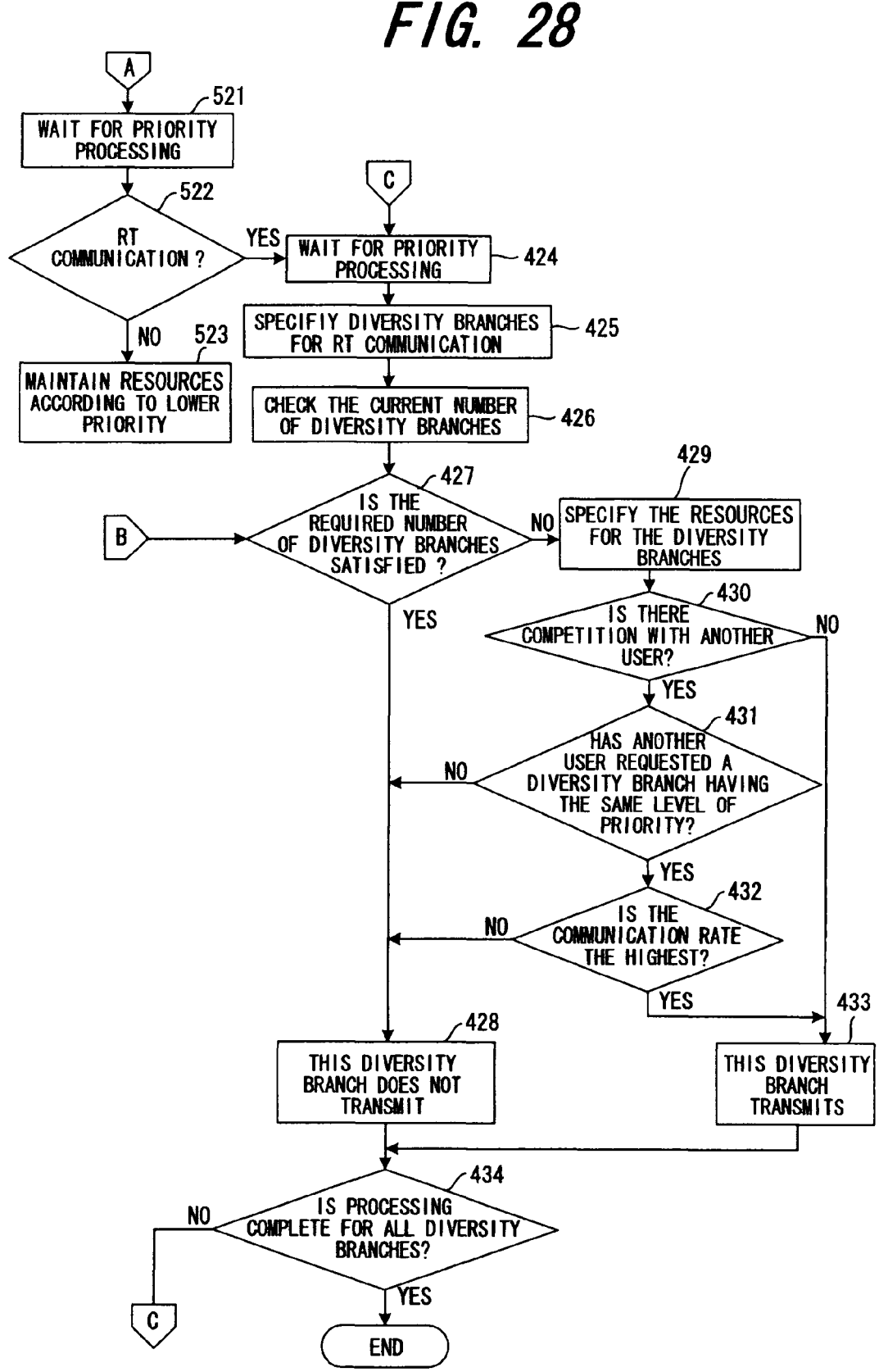
FIG. 28 is a flowchart showing the process performed by the scheduler to determine diversity branches during RT communication in a MIMO radio communication system.
Figure 30:
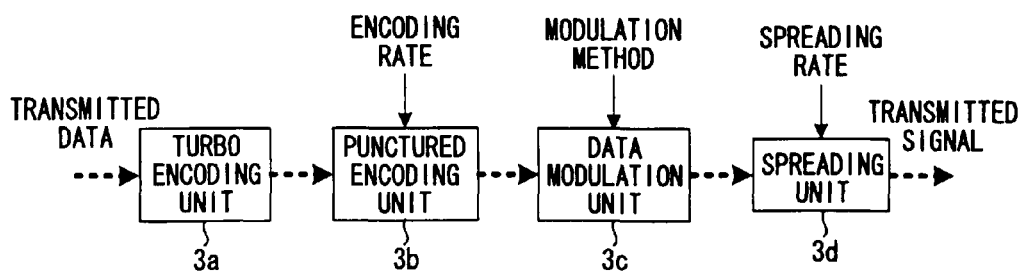
FIG. 30 is a drawing showing an example of the construction of a signal modulation unit on the transmitting side in a conventional packet transmission system.
Figure 31:
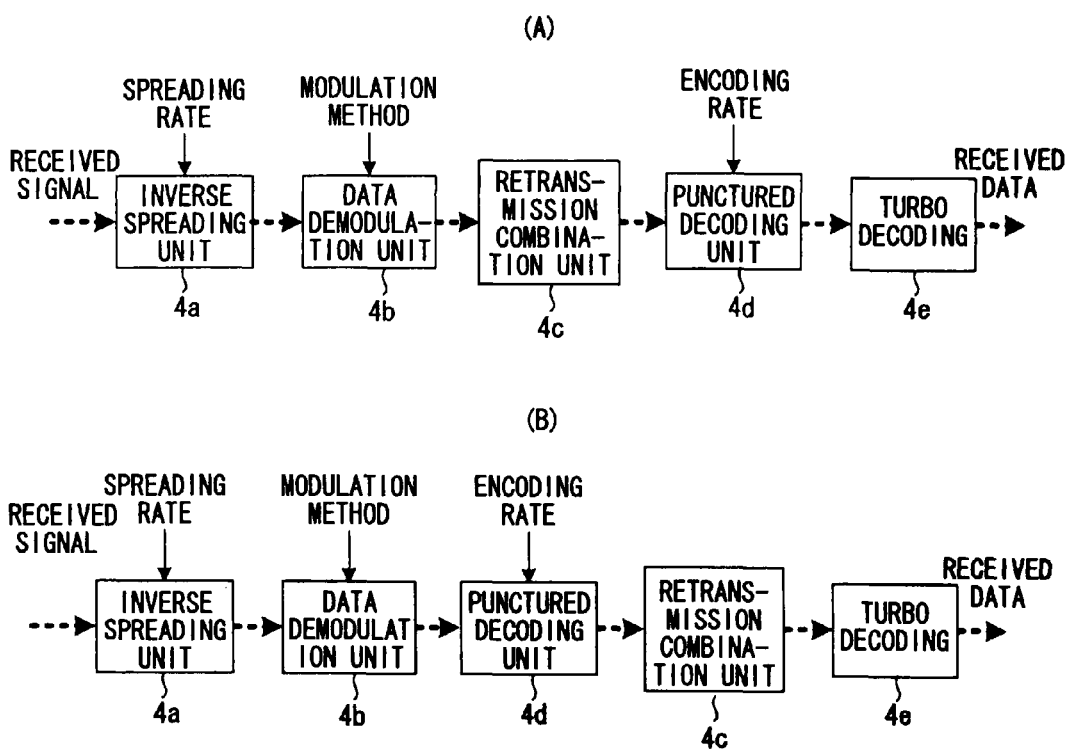
FIG. 31 is a drawing showing and example of the construction of a signal demodulation unit on the receiving side.
Figure 32:
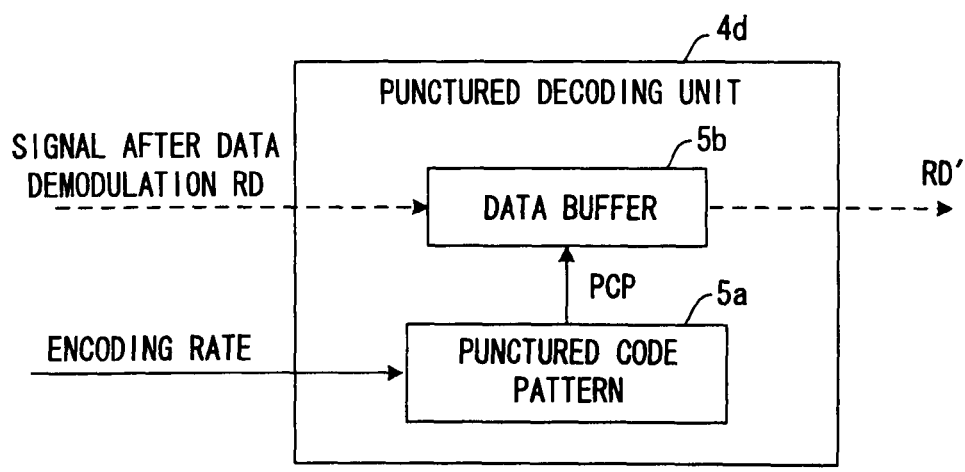
FIG. 32 is a drawing showing the construction of a punctured decoding unit.
Figure 33:
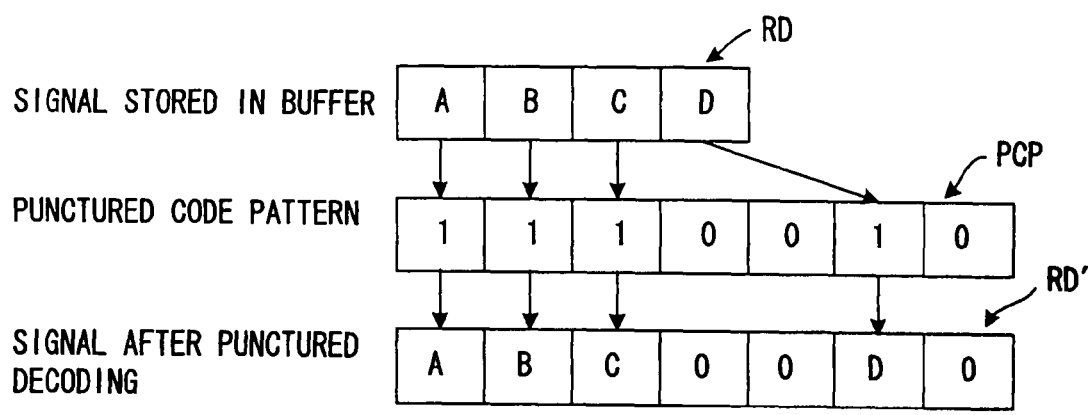
FIG. 33 is a drawing explaining a punctured code pattern and decoding.
Figure 34:
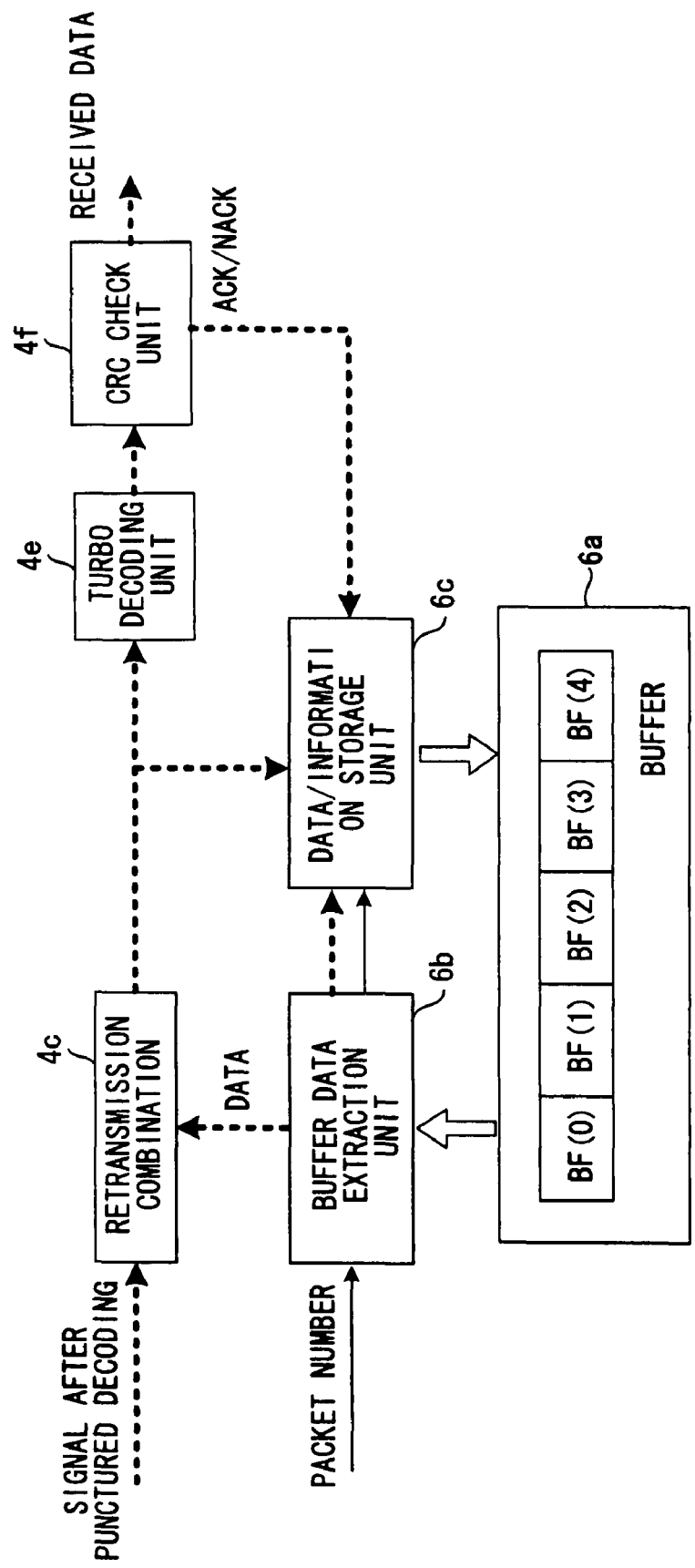
FIG. 34 is a drawing showing construction after the retransmission combination unit on the receiving side.
Figure 35:
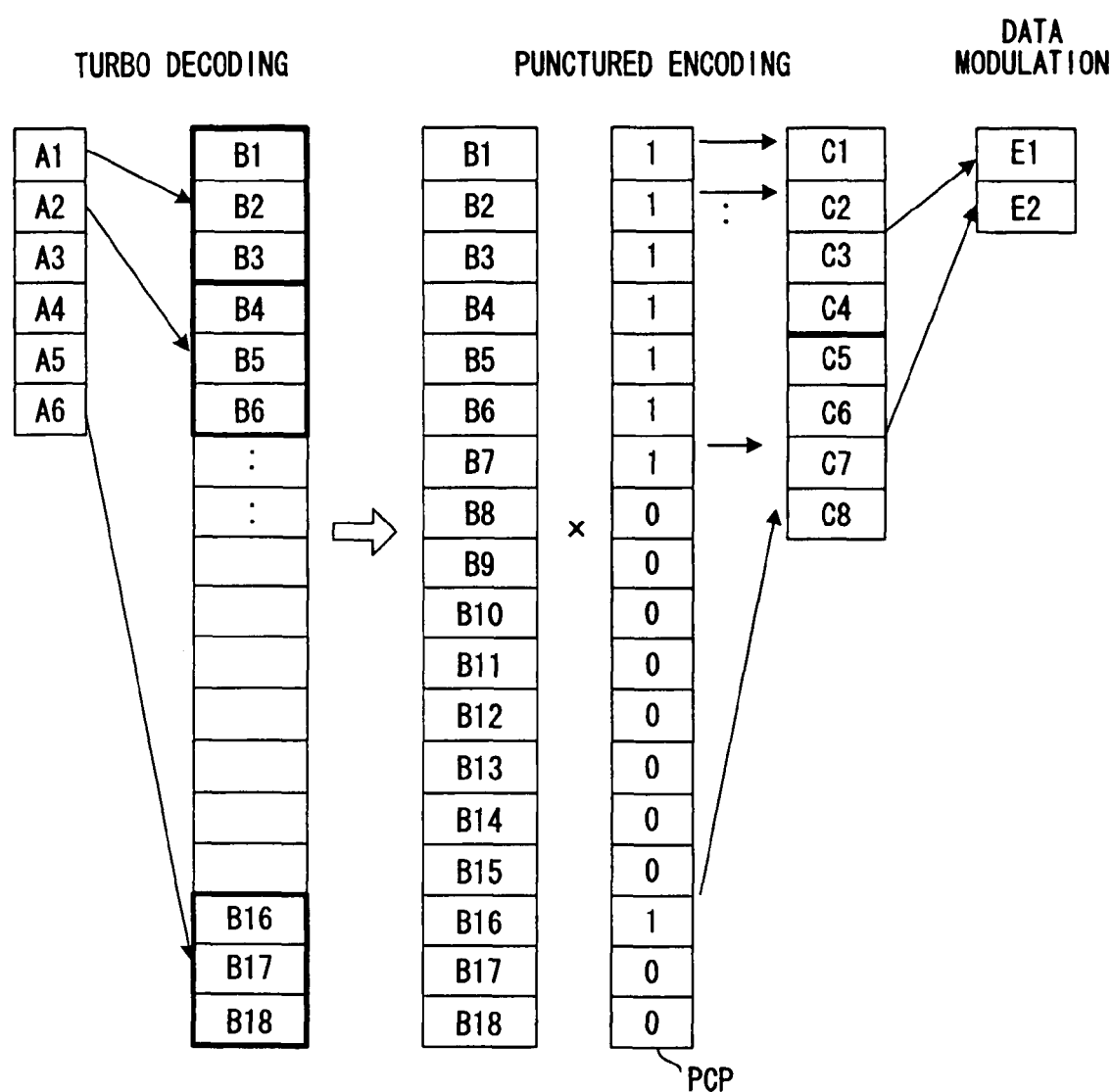
FIG. 35 is a drawing explaining signal modulation (rate matching) on the transmitting side.
Figure 36:
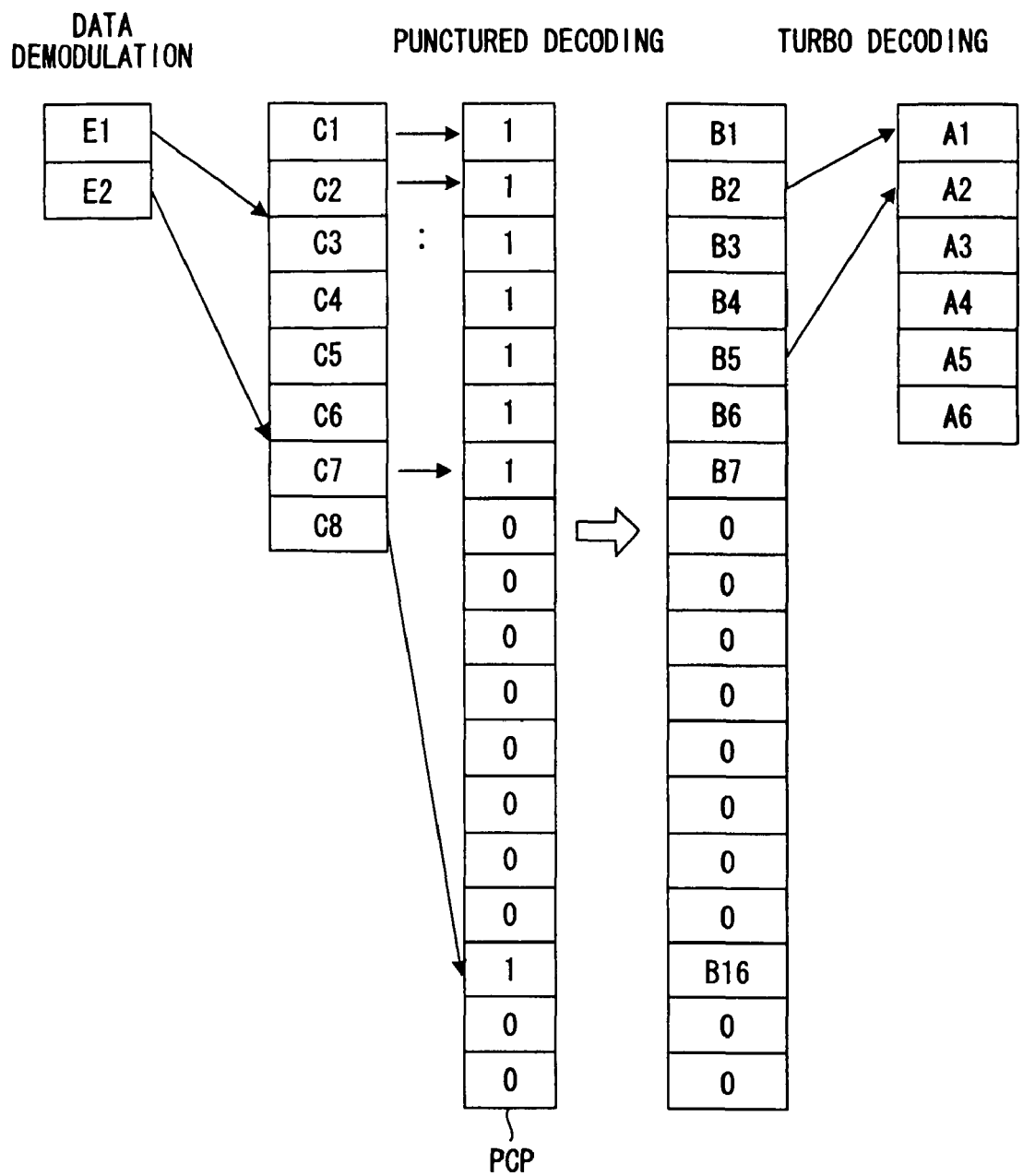
FIG. 36 is a drawing explaining signal demodulation (derate matching) on the receiving side.
Figure 40:
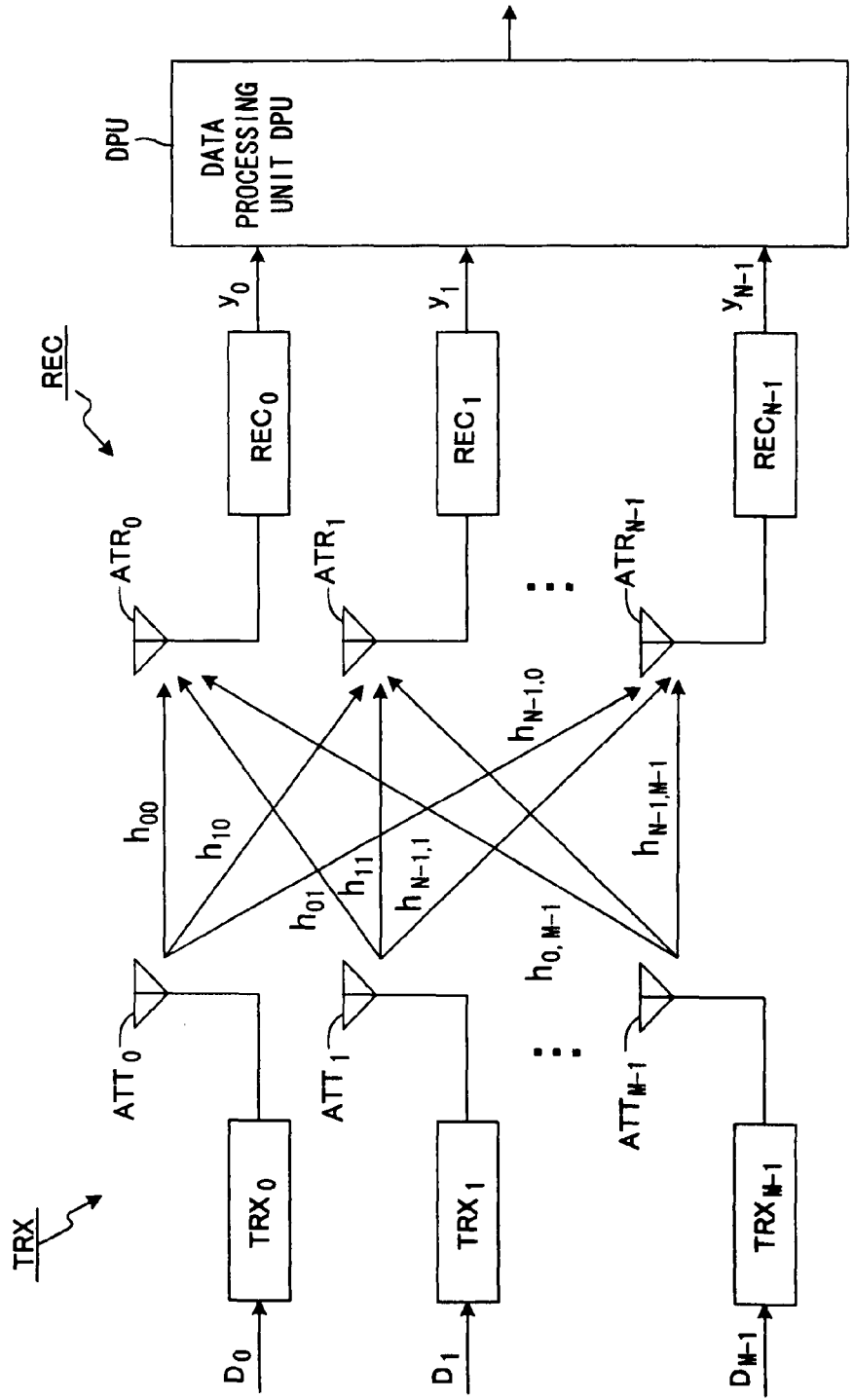
FIG. 40 is a drawing showing the construction of a MIMO multiplexing transmission system.

FIG. 27 and FIG. 28 are flowcharts showing the processing performed by the scheduler in a MIMO radio communication system for setting diversity antennas (diversity branches) during RT communication. In a state of receiving RT communication ON and the RT communication rate from the RT communication transmission instruction unit 35 (step 500), the scheduler 19 acquires feedback information from a mobile terminal (step 501). When main antennas are specified in the feedback information (step 502), the scheduler 19 maintains the transmission frequency and slot of each main antenna as the transmission resources of the main antennas (step 503), then selects the main antenna having the highest CQI (step 504) and specifies the transmission resource of this main antenna (step 505).

Next, the scheduler 19 checks whether the transmission resource competes with other users (step 506). When there is competition, the scheduler 19 compares the CQI with that of the other user (step 507), and when the CQI of the other user is larger, gives that transmission resource to the other user (step 508), and maintains the transmission frequency of the main antenna and the next slot as the new transmission resource (steps 509, 505), then repeats the process from step 506.

In step 506, when there is no competition with another user, or in step 507 when the CQI of the mobile terminal of interest is larger, the scheduler 19 sets the transmission resource saved in step 503 or step 509 as the transmission (step 510).

Next, the scheduler 19 checks whether the requested rate for RT communication can be satisfied by just the main antenna (step 511), and when it cannot be satisfied, selects the main antenna having the next highest CQI (step 512), and repeats processing from step 505.

In step 511, when the requested rate is satisfied by the main antennas, the scheduler 19 sets one diversity branch for each main antenna (step 513). Next, the communication rate is adjusted by lowering the communication rate of the main antennas by the difference between the total communication rate of the main antennas and the RT communication rate (step 514). From this, the scheduler 19 determines the main antennas and the number of diversity branches (=1) for each main antenna (step 515), and performs RT communication at the requested rate by the determined main antennas (step 516), and returns to the beginning of the process.

In step 502, when the main antennas are not specified in the feedback information, or when the main antennas are specified and the processing of steps 503 to 516 is finished, then after a specified priority process has finished, the scheduler 19 checks whether communication is MIMO multiplexed communication or RT communication (steps 521 to 522), and when MIMO multiplexed communication is in progress (RT communication is not in progress), the scheduler 19 performs no scheduling (maintains resources in lower priority) (step 523).

On the other hand, when RT communication is in progress, the scheduler 19 performs processing similar to the process from step 424 in FIG. 22, and determines one diversity branch for each main antenna.

With the second embodiment described above, in a MIMO radio communication system, MIMO communication that satisfies the RT communication rate can be performed by specifying main antennas, and maintaining RT communication resources by priority. When compared to the diversity branch communication of the first embodiment, more stable operation can be expected.

In the second embodiment described above, one diversity branch was assigned for each main antenna even when the requested RT communication rate is satisfied by a plurality of main antennas, however, it is not necessary to assign diversity branches.

What is claimed is:

1. A mobile terminal in a radio communication system in which a transmitting side uses multiple antennas to transmit signals to the mobile terminal, comprising:
   a reception quality measurement unit that measures the reception quality of each signal that is transmitted from each antenna and received by the mobile terminal;
   an antenna determination unit that determines a first antenna based on the reception qualities in real-time communication;
   a multi-dimension correlation calculation unit that calculates multi-dimension correlation between the first antenna and other antennas;
   a low correlation resource selection unit that selects all resources where the multi-dimension correlation is lower than a set value; and
   a feedback unit that feeds back data indicating the first antenna, all of the low correlation resources and reception qualities to the transmitting side so that it is possible to designate antennas corresponding to the resources of low correlation as second antennas that are candidates for diversity antennas, and to perform diversity transmission of signals to the mobile terminal using the first and second antennas.

2. A mobile terminal in a radio communication system that uses multiple antennas to perform transmission to the mobile terminal, comprising:
a reception quality measurement unit that measures the reception quality of each signal that is transmitted from each antenna and received by the mobile terminal;
an antenna determination unit that determines a plurality of first antennas forming low correlation with each other based on the reception qualities;
a multi-dimension correlation calculation unit that calculates multi-dimension correlation between each of the plurality of first antennas and other antennas;
a low correlation resource selection unit that selects all resources for each of the plurality of first antennas where the multi-dimension correlation is lower than a set value; and
a feedback unit that feeds back data that indicates each of the plurality of first antennas, all of the low correlation resources for each of the plurality of first antennas and the reception qualities to the transmitting side so that it is possible to designate antennas corresponding to the resources of low correlation as second antennas for diversity antennas for each of the plurality of first antennas, and to perform diversity transmission of signals to the mobile terminal using the plurality of first and second antennas.

3. The mobile terminal of claim 1 further comprising:
a propagation path estimation unit that estimates the propagation path from each antenna to the mobile terminal based on pilot signals that are received from each antenna during real-time communication; wherein
the reception quality measurement unit measures each of the reception qualities using the estimated propagation path values; and
the multi-dimension correlation calculation unit calculates the multi-dimension correlation using the estimated propagation path values.

4. The mobile terminal of claim 1 wherein
the multi-dimension correlation calculation unit calculates spatial correlation, time correlation, frequency correlation or a combination of any of these as the multi-dimension correlation.

5. The mobile terminal of claim 1 further comprising:
a combination unit that demodulates and combines symbols that are transmitted from the first antenna and symbols that are transmitted from the second antennas as the diversity antennas; and
a unit for performing error detection correction and decoding of the result of the combined symbols.

6. The mobile terminal of claim 1 further comprising:
a monitoring unit that monitors whether or not a state of real-time communication continues; wherein
the feedback unit transmits data that identifies the first antenna, low correlation resources and reception qualities to the transmitting side in a state of real-time communication, and transmits the reception qualities to the transmitting side in a state other than real-time communication.

7. A radio communication apparatus that uses a plurality of antennas to transmit signals to a mobile terminal, comprising:
a receiving unit that receives data, from the mobile terminal, identifying one antenna from among the plurality of antennas as a first antenna and identifying all resources where multi-dimension correlation between the first antenna and other antennas of the plurality of antennas is lower than a set value as low correlation resources;
a scheduler that determines antennas from the other antennas corresponding to the low correlation resources to be second antennas when a communication rate of the first antenna is less than a requested communication rate for real-time communication; and
a diversity transmission unit that uses the first antenna and the second antennas to perform diversity transmission of identical data to the mobile terminal.

8. A radio communication apparatus that uses a plurality of antennas to transmit signals to a mobile terminal, comprising:
a receiving unit that receives data, from the mobile terminal, identifying two or more antennas from among the plurality of antennas as of first antennas and identifying all resources where multi-dimension correlation between each first antenna and other antennas of the plurality of antennas is lower than a set value;
a scheduler that selects antennas from among the first antennas so that the total communication rate of the selected first antennas is larger than a requested communication rate in real-time communication; and
a transmission unit that transmits identical data from the selected first antennas.

9. The radio communication apparatus of claim 8 wherein
the scheduler determines antennas corresponding to the resources of low correlation with respect to the selected first antennas as second antennas for diversity antennas; and
the transmission unit transmits identical data from the selected first and second antennas.

10. The radio communication apparatus of claim 7 wherein
when there is competition between a transmission resource of the first antenna and a transmission resource of an antenna of another mobile terminal, the scheduler gives priority to and assigns that transmission resource to the mobile terminal having the best reception quality, and changes the transmission resource of the first antenna.

11. The radio communication apparatus of claim 7 wherein
when a transmission resource of the second antenna competes with a transmission resource of an antenna of another mobile terminal, the scheduler gives priority to and assigns that transmission resource to the mobile terminal having the best reception quality.

12. The radio communication apparatus of claim 7 wherein
the scheduler performs control so that the second antennas of which number corresponds to the difference between the communication rate of the first antenna and the requested communication rate during real-time communication are used in performing diversity transmission.

13. The radio communication apparatus of claim 7 further comprising:
a monitoring unit that monitors whether or not a state of real-time communication continues; wherein
the scheduler performs scheduling based on the reception qualities of the mobile terminal in a state other than real-time communication, and determines the second antennas in a state of real-time communication.

14. A radio communication method in a radio communication system in which a transmitting side uses multiple antennas to transmit signals to a mobile terminal, comprising:
measuring the reception quality of each signal that is transmitted from each antenna and received by the mobile terminal;

determining a first antenna based on the reception qualities in real-time communication;
calculating multi-dimension correlation between the first antenna and other antennas;
selecting all resources where the multi-dimension correlation is lower than a set value;
feeding back data indicating the first antenna, all of the low correlation resources and reception qualities to the transmitting side; and
designating antennas corresponding to the resources of low correlation as second antennas that are candidates for diversity antennas, and performing diversity transmission of signals to the mobile terminal using the first and second antennas.

15. The radio communication method of claim 14 further comprising:
determining antennas corresponding to the resources of low correlation to be the second antennas when the communication rate of the first antenna is less than a requested communication rate for real-time communication, and using the first and second antennas to perform diversity transmission of identical data to the mobile terminal.

16. A radio communication method in a radio communication system that uses multiple antennas to perform MIMO transmission to a mobile terminal, comprising:
measuring the reception quality of each signal that is transmitted from each antenna and received by the mobile terminal;
determining a plurality of first antennas corresponding to low correlation with each other based on the reception qualities;
calculating multi-dimension correlation between each first antenna and other antennas;
selecting all resources for each of the plurality of first antennas where the multi-dimension correlation is lower than a set value;
feeding back data that indicates each of the plurality of first antennas, all of the low correlation resources for each of the first antennas and the reception qualities to the transmitting side; and
transmitting identical data from at least the plurality of first antennas to the mobile terminal.

17. The radio communication method of claim 16 further comprising:
selecting first antennas so that the total communication rate of the selected first antennas is larger than a requested communication rate in real-time communication;
determining antennas corresponding to the resources of low correlation with respect to the selected first antennas as second antennas for diversity; and
transmitting identical data from the selected first antennas and second antennas.

* * * * *